US010529378B2

(12) United States Patent
Miura et al.

(10) Patent No.: US 10,529,378 B2
(45) Date of Patent: Jan. 7, 2020

(54) INFORMATION STORAGE DEVICE AND FALSIFICATION PREVENTION METHOD FOR INFORMATION STORAGE DEVICE

(71) Applicant: OLYMPUS CORPORATION, Hachioji-shi, Tokyo (JP)

(72) Inventors: Hiroaki Miura, Hachioji (JP); Kenta Yumoto, Hachioji (JP); Masatoshi Tobinai, Inagi (JP); Osamu Nonaka, Sagamihara (JP)

(73) Assignee: OLYMPUS CORPORATION, Tokyo (JP)

( * ) Notice: Subject to any disclaimer, the term of this patent is extended or adjusted under 35 U.S.C. 154(b) by 239 days.

(21) Appl. No.: 15/297,374

(22) Filed: Oct. 19, 2016

(65) Prior Publication Data
US 2017/0117017 A1    Apr. 27, 2017

(30) Foreign Application Priority Data

Oct. 26, 2015  (JP) .................................. 2015-209798

(51) Int. Cl.
| | |
|---|---|
| *G11B 27/031* | (2006.01) |
| *G11B 27/30* | (2006.01) |
| *G11B 27/36* | (2006.01) |
| *G11B 27/00* | (2006.01) |
| *G11B 27/19* | (2006.01) |

(52) U.S. Cl.
CPC .......... *G11B 27/031* (2013.01); *G11B 27/005* (2013.01); *G11B 27/19* (2013.01); *G11B 27/309* (2013.01); *G11B 27/36* (2013.01)

(58) Field of Classification Search
None
See application file for complete search history.

(56) References Cited

U.S. PATENT DOCUMENTS

| 5,974,141 A * | 10/1999 | Saito ...................... G06F 21/10 348/E7.06 |
| 2007/0050423 A1* | 3/2007 | Whalen ............... G06F 16/1752 |
| 2016/0241807 A1* | 8/2016 | Kovac ..................... H04N 5/77 |

FOREIGN PATENT DOCUMENTS

| CN | 1585020 A | 2/2005 |
| JP | 07-129199 A | 5/1995 |
| JP | 2000-173185 A | 6/2000 |

OTHER PUBLICATIONS

Office Action issued in corresponding Chinese Patent Application No. 201610940655.6 dated Mar. 6, 2019, consisting of 4 pp.
Office Action issued in corresponding Japanese Patent Application No. 2015-209798 dated Mar. 11, 2019, consisting of 3 pp.

* cited by examiner

*Primary Examiner* — Heather R Jones
(74) *Attorney, Agent, or Firm* — Volpe and Koenig, P.C.

(57) ABSTRACT

An information storage device, comprises an information input device for acquiring voice data and/or image data, a falsification prevention circuit that subjects the voice data and/or image data to falsification prevention processing, operation members for carrying out editing operations on the voice data and/or image data, and a controller for creating an editing evidence file that gives a history of editing operations on the voice data and/or image data, based on editing operations using the operation members.

9 Claims, 15 Drawing Sheets

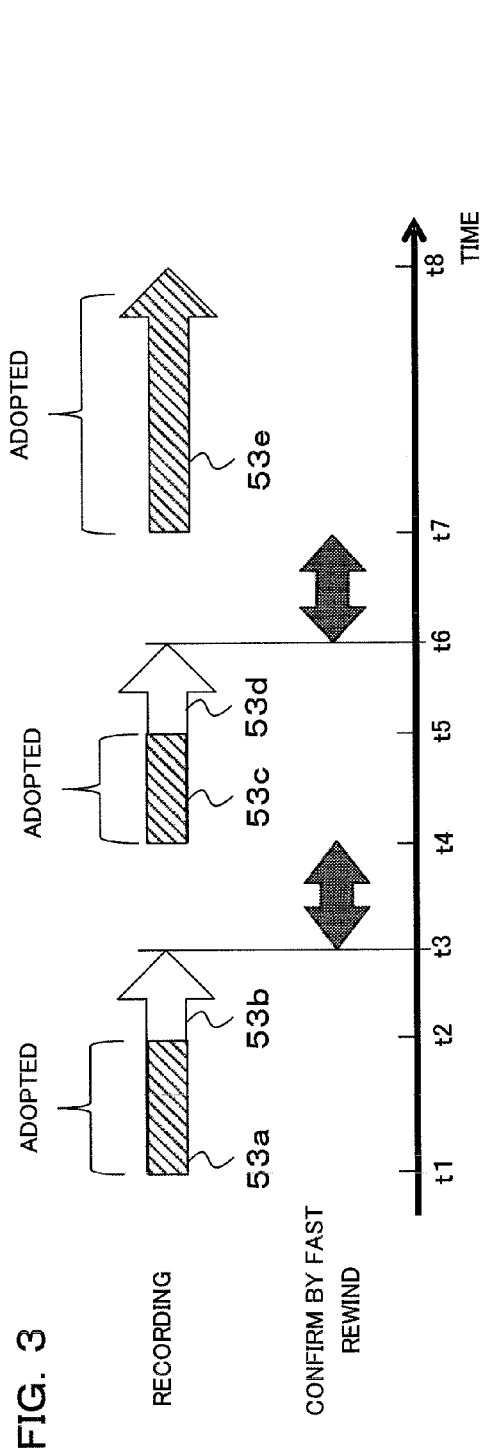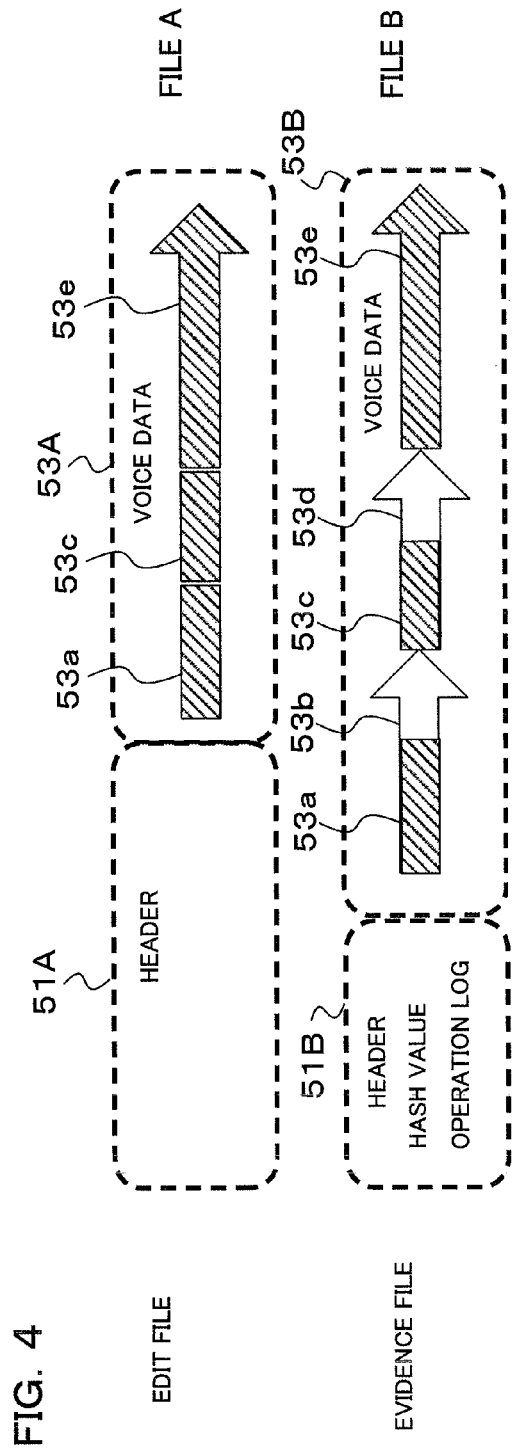

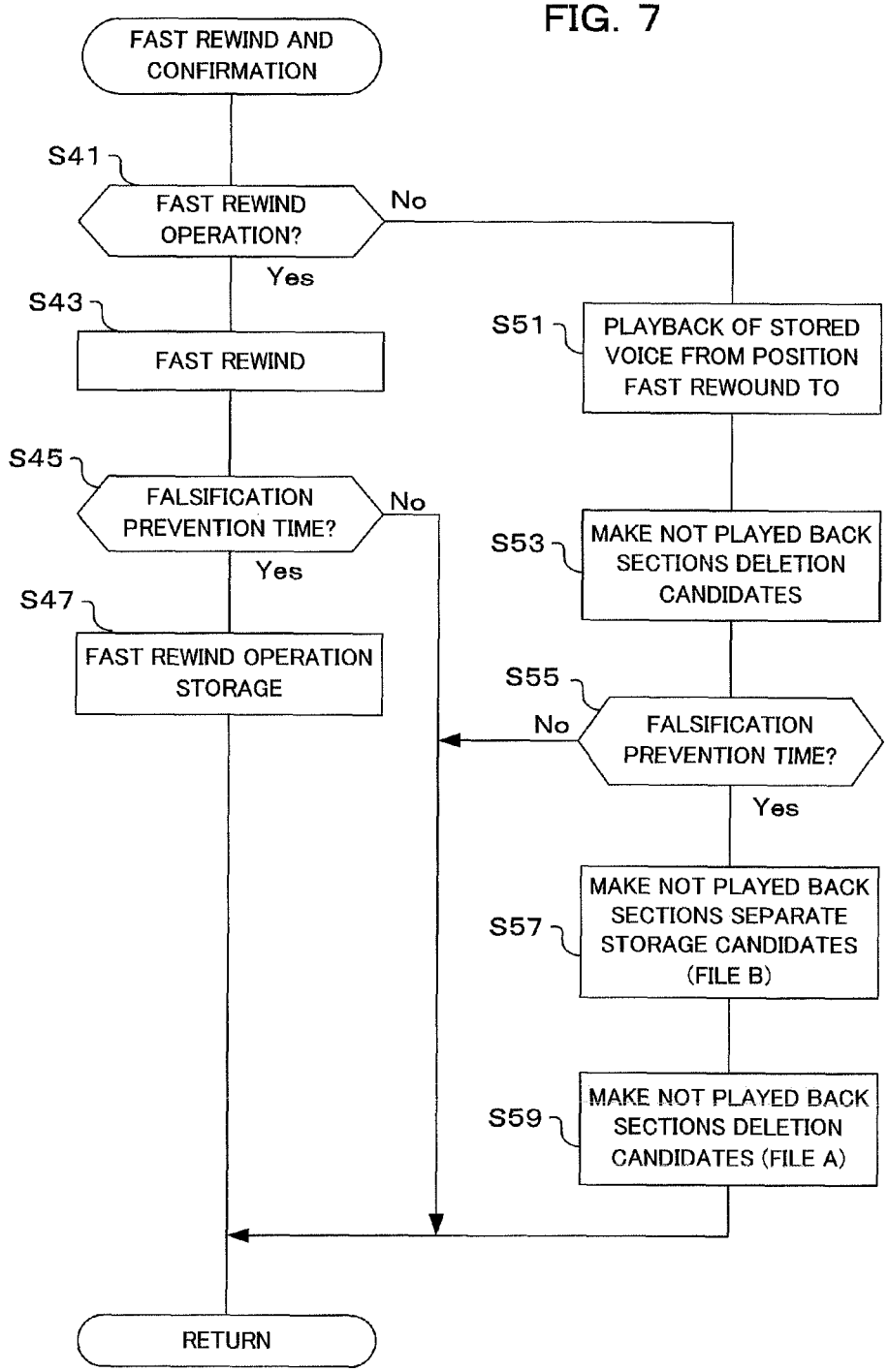

INFORMATION STORAGE DEVICE AND FALSIFICATION PREVENTION METHOD FOR INFORMATION STORAGE DEVICE

Benefit is claimed, under 35 U.S.C. § 119, to the filing date of prior Japanese Patent Application No. 2015-209798 filed on Oct. 26, 2015. This application is expressly incorporated herein by reference. The scope of the present invention is not limited to any requirements of the specific embodiments described in the application.

BACKGROUND OF THE INVENTION

1. Field of the Invention

The present invention relates to an information storage device that carries out falsification prevention processing at the time of storing information such as audio and movies etc., and to a falsification prevention method for the information storage device.

2. Description of the Related Art

An information storage device which, when storing information such as voice etc., carries out falsification prevention processing, so that when information such as voice data is stored this data can be used in the future as evidence, has been proposed (refer, for example to Japanese patent laid-open No. 2000-173185 (hereafter patent publication 1).

When voice and movies are stored, there are not always important parts continuously during the storage operation. It is therefore convenient if it is possible to delete parts that are not important by editing, and to store while editing by carrying out fast rewind during a storage operation. Specifically, it is convenient, when storing information such as voice, for the user to be able to playback and store voice etc. again from a storage position of data that the user has determined unnecessary, while performing playback after having operated a fast rewind member to fast rewind a recorded section.

In the storage device with which it is possible to carry out storage of voice data etc. while carrying out this type of editing, there is no mention whatsoever in patent publication 1 regarding carrying out falsification prevention. There is also no description recording storage of a history of when editing operations have been carried out, in a case such as where falsification prevention processing has been applied.

SUMMARY OF THE INVENTION

An object of the present invention is to provide an information storage device capable of carrying out falsification processing even in a case where storage of voice data etc. is carried out while performing editing, and that is capable of storing a history in a case where editing operations have been carried out, and a falsification prevention method for an information storage device.

An information storage device of a first aspect of the present invention comprises: an information input device for acquiring voice data and/or image data, a falsification prevention circuit that subjects the voice data and/or image data to falsification prevention processing, operation members for carrying out editing operations on the voice data and/or image data, and a controller for creating an editing evidence file that gives a history of editing operations on the voice data and/or image data, based on editing operations using the operation members.

An information storage device of a second aspect of the present invention comprises: an information input device for acquiring voice data and/or image data, a falsification prevention circuit that subjects the voice data and/or image data to falsification prevention processing, operation members for carrying out editing operations, and a controller that, in a case where the voice data and/or image data that has been acquired using the information input section have become deletion candidates as a result of editing operations using the operation members, applies falsification prevention processing using the falsification prevention circuit to data that contains voice data and/or image data that constitute the deletion candidates.

A falsification prevention method for an information storage device, of a third aspect of the present invention comprises: acquiring voice data and/or image data, subjecting the voice data and/or image data to falsification prevention processing, and in a case where the voice data and/or image data have become deletion candidates as a result of editing operations using operation members, applying falsification prevention processing to data that contains voice data and/or image data that constitute the deletion candidates.

BRIEF DESCRIPTION OF THE DRAWINGS

FIG. 3 is a drawing for describing a recording section of a terminal device of the first embodiment of the present invention.

FIG. 4 is a drawing for describing a voice file of the terminal device of the first embodiment of the present invention.

FIG. 7 is a flowchart showing "fast rewind and confirmation" operation of the terminal device of a first embodiment of the present invention.

DETAILED DESCRIPTION OF THE PREFERRED EMBODIMENTS

An example where an information recording system is adopted as a preferred embodiment of the present invention will be described in the following. A terminal device of this information storage system has a microphone for voice data input and an image sensor for image data input, and is capable of storing data in a storage section after applying normal voice processing and image processing without carrying out falsification prevention processing on voice data and movie image data that has been input. There is also a falsification prevention section for carrying out falsification prevention processing on the voice data and/or image data, and in a case where given conditions have been met at the time of falsification prevention, data that has been subjected to falsification prevention processing by the falsification prevention section is stored in the storage section separately from the data that has been subjected to normal processing.

Also, this terminal device has a fast rewind operation member, and if a fast rewind operation is carried out during storage fast rewind is performed, while if the fast rewind is canceled playback is carried out, and rerecording of voice data etc. is carried out again from a storage position for which the user has determined that storage is not necessary. In a case where falsification prevention processing has been designated, in the first embodiment falsification prevention processing is applied, including any sections that have been subjected to fast rewind (refer to evidence file of FIG. 4). In a second embodiment, which will be described later, falsification prevention processing is carried out for data after it has been overwritten (refer to the edit file in FIG. 9).

Figure 1:
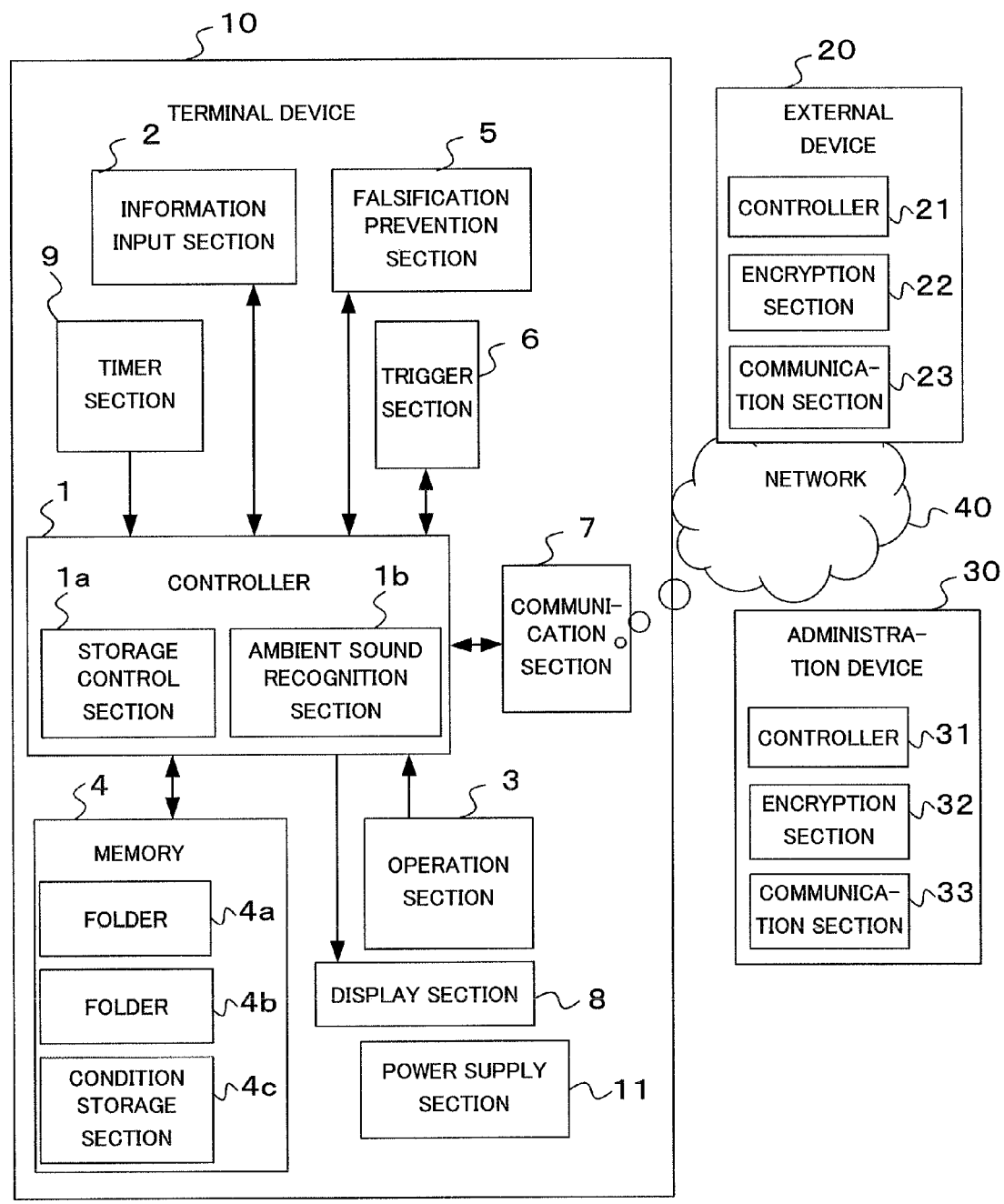
FIG. 1 is a block diagram mainly showing the electrical structure of an information recording system of a first embodiment of the present invention.

FIG. 1 is a block diagram mainly showing the electrical structure of an information recording system of a first embodiment of the present invention. This information recording system is made up of a terminal device 10, an external device 20, an administration device 30, and a network 40 that links these components.

In FIG. 1, the terminal device 10 performs input and storage of voice data and/or image data. The external device 20 is a playback device for voice data and/or image data that has been stored by the terminal device 10, and in the case of data that has been subjected to falsification prevention processing it is possible to display whether or not the data has been authenticated by the administration device 30. The administration device 30 carries out necessary registration procedures at the time of falsification prevention processing in the terminal device 10 by means of the network 40, and notifies the external device 20 as to whether or not data has been authenticated by the administration device 30.

An information input section 2 within the terminal device 10 includes a microphone for voice data input, and a voice data processing circuit etc. for the voice data that has been input using the microphone. The information input section 2 also includes an image sensor for image data input, and an imaging control circuit for this image sensor etc. Voice data and image data that have been input to and processed by the information input section 2 are output to a controller 1. The information input section 2 functions as an information input device for acquiring voice data and/or image data.

A falsification prevention section 5 has a falsification prevention circuit etc., and applies known falsification prevention processing to the voice data and image data that has been input to and processed by the information input section 2, and outputs the processed data to the controller 1. As falsification prevention processing, for example, processing carried out every given data amount by applying a concept such as a hash function etc. Processing such as encryption that has also taken into account a master key, such as a private key, may also be applied to data that has been subjected to falsification prevention processing. By applying encryption processing, it is possible to achieve a higher level of falsification prevention. The falsification prevention section 5 functions as a falsification prevention circuit that subjects voice data and/or image data to falsification prevention processing.

It should be noted that falsification prevention technology may also be referred to as electronic signature technology in cases where the exchange of data has been considered. Specifically, a party transmits an electronic signature that has been encrypted using a private key, contents data of images and audio, and a public key to another party, and the received party decrypts the electronic signature using the public key to create a digest from the transmitted contents data using a hash function, so it is then possible to detect falsification by comparison of the electronic signature. In the following, description of the falsification prevention also includes a process to encrypt using this type of hash function creation and private key. Stringency etc. of the encryption and public and private keys may be changed in accordance with the level it is necessary to acquire. Computation for data verification other than hash function may also be adopted.

A timer section 9 has a timer, and outputs time and date information (calendar information) to the controller 1. This time and date information is made input and creation time information of the voice data and/or the image data, and is stored by being attached to the voice data and/or the image data. It is also possible to use, for time and date information, the time at which falsification prevention processing is carried out. For example, as will be described later using FIG. 5, it is possible to store time information of storage time in a sector head of the voice data.

A trigger section 6 issues a trigger for start and end of falsification prevention processing for the voice data and/or the image data by the falsification prevention section 5. As will be described later, regarding the falsification prevention processing, if conditions that have been stored in a condition storage section 4c have been satisfied, the trigger section 6 carries out trigger output to the controller 1 and falsification prevention processing is executed (refer to S3 in FIG. 6A regarding conditions for carrying out trigger output).

The communication section 7 has a communication circuit, is connected with the external device 20 and the administration device 30 by means of the network 40 and USB connectors etc., and outputs voice data and/or image data that have been stored in the memory 4. The communication section 7 also carries out registration procedures for falsification prevention processing by the administration device 30.

An operation section 3 has a slide switch, and in the case of handling voice data if this slide switch is sequential slid then depending on the position of the switch recording instruction, stop instruction, playback instruction and fast rewind instruction are designated. Besides a slide switch, it is also possible to have a fast-forward button, stop button, edit button, and menu button. It should be noted that instead of the slide switch, it is also possible to provide a record button, fast rewind button, playback button, and stop button etc. The operation section 3 provides a function as an operation member for carrying out editing operations.

Also, in a case where the terminal device 10 handles image data, the operation section 3 has operation members such as a release button, movie button, playback button, edit button, and menu button, and operating states of these operation members are detected and output to the controller 1. The operation section 3 also has a falsification prevention processing instruction button (trigger button) for instructing start and end of falsification prevention processing, with operating state of this falsification prevention processing instruction button being detected and output to the controller 1.

The display section 8 carries out live view display, playback display and menu screen display etc. in the case of handling image data, and in the case of handling voice data carries out display of menu screens etc. Also, in the event that falsification prevention processing is being performed, the display section 8 carries out warning display indicating that processing is in progress. There is also a playback speaker for when voice data is handled. A power supply section 11 includes a power supply battery etc., and supplies power to each section of the terminal device 10.

The memory 4 has an electrically rewritable non-volatile memory and a volatile memory, with a folder 4a, folder 4b and condition storage section 4c being constituted using these memories. The folder 4a is a folder for storing voice data and/or image data that has been subjected to normal processing and has not been subjected to falsification prevention processing. The folder 4b is a folder for storing voice data and/or image data that has been subjected to falsification prevention processing.

Predetermined conditions for instructing start and end of falsification prevention processing in the trigger section 6 are stored in the condition storage section 4c. As conditions for start and end of the falsification prevention processing, for example, falsification prevention processing may be started if a trigger button within the operation section 3 is pressed, and the falsification prevention processing may be ended if pressing of the trigger button is released.

A predetermined condition may be a designated period that has been designated by the user at the time voice data and/or image data is being acquired. Also, as predetermined conditions, the falsification prevention processing may be started if a time that has been previously designated based on time and date information from the timer section 9 is reached, and falsification prevention processing may be ended if a previously designated time is reached.

Also, as predetermined conditions, speech recognition processing may be carried out for voice data that has been input by the information input section 2, and the falsification prevention processing started if a specified phrase is detected, and falsification prevention processing ended if the specified phrase is detected. A vibration detection section or the like may also be provided within the terminal device 10, and falsification prevention processing started if specified movement such as is not normally applied is detected, and the falsification prevention processing ended if the specified movement is detected again.

The previously described example conditions are stored in the condition storage section 4c. These conditions may be stored in non-volatile memory at the factory shipping stage, or may be appropriately set by the user from menu screens (refer, for example, to S35 in FIG. 6B). The condition storage section 4c functions as a condition storage section (condition storage memory) for storing predetermined conditions for carrying out falsification prevention processing using the falsification prevention section.

The controller 1 includes a CPU (Central Processing Unit), peripheral circuitry and an electrically rewritable memory (for example, flash ROM) in which program code has been stored, and controls each of the sections within the terminal device 10 in accordance with program code. There are also processing circuits for voice data and/or image data within the controller 1, for example, A/D converters, an image processing circuit, image compression circuit, image expansion circuit, voice compression circuit, voice expansion circuit, image editing section and voice editing section etc.

There are also a storage control section 1a and ambient sound recognition section 1b within the controller 1. The functions of each of these sections are executed by the previously mentioned CPU, peripheral circuits and the program code. The storage control section 1a carries out storage control so as to store data, that has been input by the information input section 2 and subjected to voice processing and image processing, into the folder 4a, and store data that has been subjected to falsification prevention processing by the falsification prevention section 5 into the folder 4b. It is also possible to carry out editing processing on data that has not been subjected to falsification prevention processing. As editing processing there are, for example, noise removal processing, deleting of partial data, editing operations etc.

The ambient sound recognition section 1b removes noise from voice data. Since noise has a specified frequency and specified waveform, and there are cases where noise has a sustained tone, data portions having these characteristics are extracted to remove noise. It should be noted that in the event that falsification prevention processing is applied noise removal processing is not carried out (refer to the evidence file of FIG. 4). Since falsification prevention processing is for increasing admissibility of evidence by faithfully storing original sounds, editing processing such as noise removal processing is not carried out.

Further, the ambient sound recognition section 1b and the controller 1 carry out removal of image noise on the image data. The ambient sound recognition section 1b functions as a noise removal section that removes ambient noise from the voice data, and/or removes image noise from the image data. In the case of applying falsification prevention processing using the falsification prevention section, removal of the ambient noise and/or removal of image noise by the noise removal section is prohibited (refer, for example, to S7 in FIG. 6A).

The controller 1 also functions as a controller for creating an editing evidence file that gives a history of editing operations on the voice data and/or the image data, based on editing operations using the operation members (refer, for example, to S47 in FIG. 7). The controller 1 functions as a controller for, in a case where voice data and/or image data that has been acquired using the information input section have become deletion candidates as a result of editing operations using the operation members, applying falsification prevention processing using the falsification prevention section to data that contains voice data and/or image data that constitute the deletion candidates (refer, for example, to S7 in FIG. 6A).

Figure 6A:
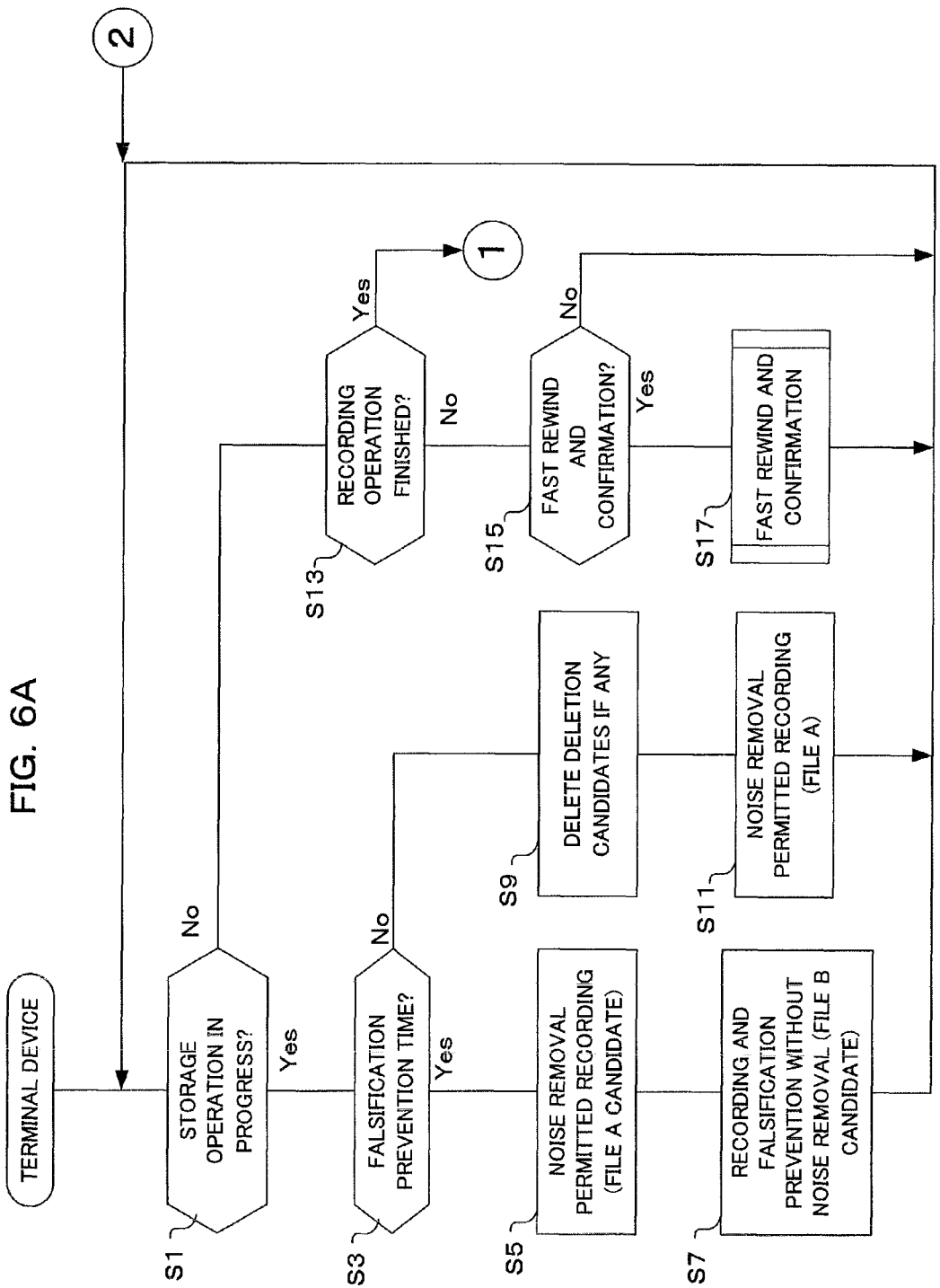
FIG. 6A and FIG. 6B are flowcharts showing operation of the terminal device of a first embodiment of the present invention.

The controller 1 also functions as a controller for, if predetermined conditions are met, storing both voice data and/or image data that has been subjected to falsification prevention processing by the falsification prevention section, and voice data and/or image data that has not been subjected to falsification prevention processing, in memory (refer, for example, to S3-S11 in FIG. 6A).

The external device 20 is a dedicated device for playback of voice data and/or image data, a personal computer for inputting and playing back voice data and/or image data, etc.

Within the external device 20 there are a controller 21, encryption section 22, and communication section 23.

The communication section 23 has a communication circuit, and carries out communication with the terminal device 10 by means of the network 40, and is input with voice data and/or image data. The communications section 23 is also input with voice data and/or image data from the terminal device by means of a USB connector etc. It should be noted that besides direct input of voice data and/or image data from the terminal device, data can be indirectly input via a server.

The encryption section 22 has an encryption processing circuit, and carries out decoding processing of image data that has already been subjected to falsification prevention processing and been encrypted. As described previously, when carrying out falsification prevention processing in the falsification prevention section 5, there may be cases where encryption is applied for the falsification prevention processing. This encrypting section 22 therefore carries out decoding of image data that has already been subjected to falsification prevention processing and has had this type of encryption applied. Required data for decoding is acquired from the administration device 30.

The controller 21 includes a CPU (Central Processing Unit), peripheral circuitry and an electrically rewritable memory (for example, flash ROM) in which program code has been stored, and controls each of the sections within the external device 20 in accordance with program code.

Also, the controller 21 carries out playback processing of voice data and/or image data that has been subjected to normal processing, and voice and/or image data that has been subjected to falsification prevention processing, in accordance with program code. The controller 21 also carries out determination as to whether or not falsification prevention processing is being performed, and carries out display of determination results. Editing processing is also performed on data that has not been subjected to falsification prevention processing.

The administration device 30 is a server connected to the network 40, and transmits data that is required for falsification prevention processing for the voice data and/or the image data to the terminal device 10 in accordance with a request from the terminal device 10 (also referred to as registration process). Also, determination as to whether or not the data has been subjected to falsification prevention processing is made in accordance with requests from the terminal device 10 and the external device 20, or data for determination, is output. There are a controller 31, encryption section 32, and communication section 33 within the administration device 30, The communication section 33 has a communication circuit, and carries out communication with the terminal device 10 and the external device 20 by means of the network 40. As communication there are transmission of data necessary for falsification prevention processing to the terminal device 10, and transmission of data for determining whether or not falsification prevention processing has been appropriately performed.

The encryption section 32 has an encryption processing circuit, and determines necessary determination in the case of carrying out encryption when carrying out falsification prevention processing, and stores data for decryption. The data necessary for this encryption and decryption is transmitted after authentication by the terminal device 10 and the external device 20.

The controller 31 includes a CPU (Central Processing Unit), peripheral circuitry and an electrically rewritable memory (for example, flash ROM) in which program code has been stored, and controls each of the sections within the administration device 30 in accordance with program code.

The controller 31 also executes processing for transmitting data for falsification prevention processing to the terminal device 10 in accordance with program code. Also, the controller carries out determination as to whether or not falsification prevention processing is being carried out on data, and outputs determination results to the external device 20 etc. The controller 31 also outputs data for determining falsification prevention processing to the external device 20 etc.

Figure 2A:
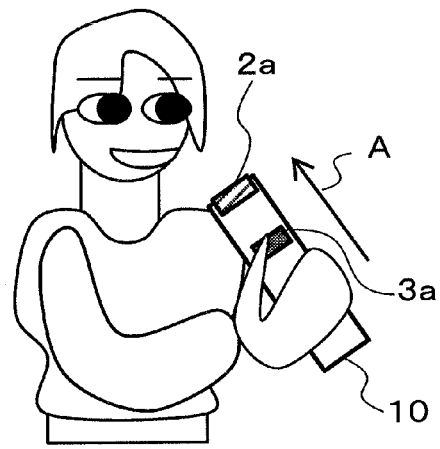
FIG. 2A-FIG. 2C are drawings for describing usage states of a terminal device of a first embodiment of the present invention.

Next, fast rewind and overwriting recording operations (hereafter referred to as fast rewind and recording operation) of the terminal device 10 will be described using FIG. 2A-FIG. 2C. In FIG. 2A, if the slide switch 3a of the operation section 3 is slid in the direction of the arrow A to a recording position, voice data is input from the microphone 2a and a recording state is entered. From this state, if the slide switch 3a is slid in the direction of the arrow A to a fast rewind position, as shown in FIG. 2B, already stored voice data is played back at high speed while performing fast rewind of the voice data that has been stored.

Figure 2B:
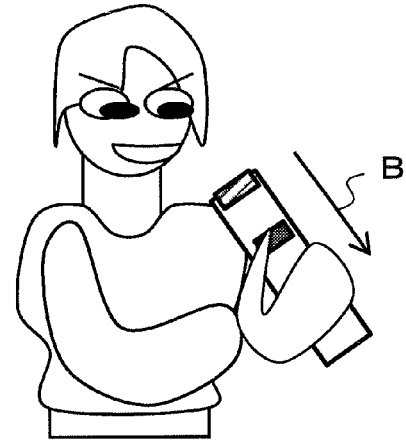
Figure 2C:

In the state shown in FIG. 2B voice is played back at high speed while performing fast rewind, which means that the user can confirm sections where recording has failed. If a position where failed sections can be deleted is returned to, the user slides the slide switch 3a in the direction of arrow A to the recording position, as shown in FIG. 2C, and recording is resumed. In this way, voice data is newly stored by overwriting unwanted sections of the voice data that has been stored.

Next, using FIG. 3, voice data stored using the fast rewind and recording operation, in a case where falsification prevention processing is not carried out, will be described. At time t1, the user slides the slide switch 3a to establish a recording state (refer to FIG. 2A). In this state, recording continues until time t3, and the voice data 53a, 53b is stored. At time t3 the user slides the slide switch 3a in the fast rewind direction (refer to FIG. 2B) in the realization that unnecessary portions have been recorded.

Once time t4 is reached, it is possible to return to the initial position of an unwanted portion. Voice data at this time corresponds to data that was recorded at precisely time t2. If recording is resumed from time t4, then the voice data 53b that was recorded in the period from time t2 to time t3 is overwritten with voice data 53c from time t4.

Further, if time t6 is reached, then as with the case for time t3 the user slides the slide switch 3a in the fast rewind direction (refer to FIG. 2B) in the realization that unnecessary portions have been recorded. Once time t7 is reached, it is possible to return to the initial position of an unwanted portion. Voice data at this time corresponds to data that was recorded at precisely time t5. If recording is resumed from time t7, then the voice data 53d that was recorded in the period from time t5 to time t6 is overwritten with voice data 53e from time t7.

In this way, in the event that falsification prevention processing is not carried out, by carrying out a fast rewind and recording operation temporary recording is performed in the periods t2-t3, and t5-t6. However, since this voice data is recorded by overwriting, ultimately voice data 53a, 53c and 53e for the periods t1-t2, t4-t5, and t7-t8 is stored in the memory 4 as voice data for editing (refer to the edit file in FIG. 4, which will be described later).

Next, the case where falsification prevention processing is carried out will be described. In this case, even if fast rewind is carried out at time t3, voice data is stored as is in the memory 4 without recording by overwriting the voice data 53b, 53d for the periods t2-t3 and t5-t6 (refer to the evidence file in FIG. 4 which will be described later). Accordingly, falsification prevention processing is applied to the voice data 53a-53e that has been stored in the periods t1-t3, t4-t6 and t7-t8.

In this way, in a case where falsification prevention processing is carried out, all voice data that has been acquired by carrying out a fast rewind and recording operation is stored, and falsification prevention processing is applied to these items of voice data. Specifically, voice data 53b and 53d that was ultimately erased in the case where falsification prevention processing was not carried out is also stored in the case of carrying out falsification prevention processing.

It should be noted that in a case where falsification prevention processing has been carried out also, at the time of playback of the voice data, only the voice data 53a, 53c and 53 that were stored in the periods t1-t2, t4-t5 and t7-t8 may be played back. In performing this type of playback, the fact that there is voice data corresponding to overwritten portions is stored in a header, and at the time of playback those portions may be skipped. For evidence authentication, while these portions are not audible as voice, it will be understood that they exist if data is seen, and they may be listened to using a dedicated application.

Next, two types of voice file that are stored in this embodiment will be described using FIG. 4. In this embodiment, as shown in FIG. 4, in a case where falsification prevention processing has not been designated, an edit file is created as shown in the upper part of FIG. 4, while when falsification prevention processing has been designated an evidence file is created as shown in the lower part of FIG. 4.

The edit file shown in the upper part of FIG. 4 (called file A) comprises a header 51A and voice data 53A, and the previously described voice data 53a, 53c and 53e are stored in the voice data 51. This edit file is a useful file format at the time of dictation, and since falsification prevention processing has not been applied editing is also possible.

The authentication file shown in the lower part of FIG. 4 (called file B) comprises a header 51B and voice data 53B. Besides information that is written to a normal header, a hash value for determining whether or not falsification has been carried out and an operation log is stored in the header 51B. The operation log stores various operation information such as time recording was started, time recording was finished, time fast rewind was started, and time fast rewind was finished etc. By reading this operation log from the header etc. it is possible to verify an editing history, and it can also be used at the time of determining whether or not falsification has been performed.

Also, differing from file A, the file B also contains voice data 53b and 53d that was deleted by being overwritten, and all of the voice data 53a-53e are stored. The hash value stored in the header 51B is calculated based on all of the voice data.

Figure 5:
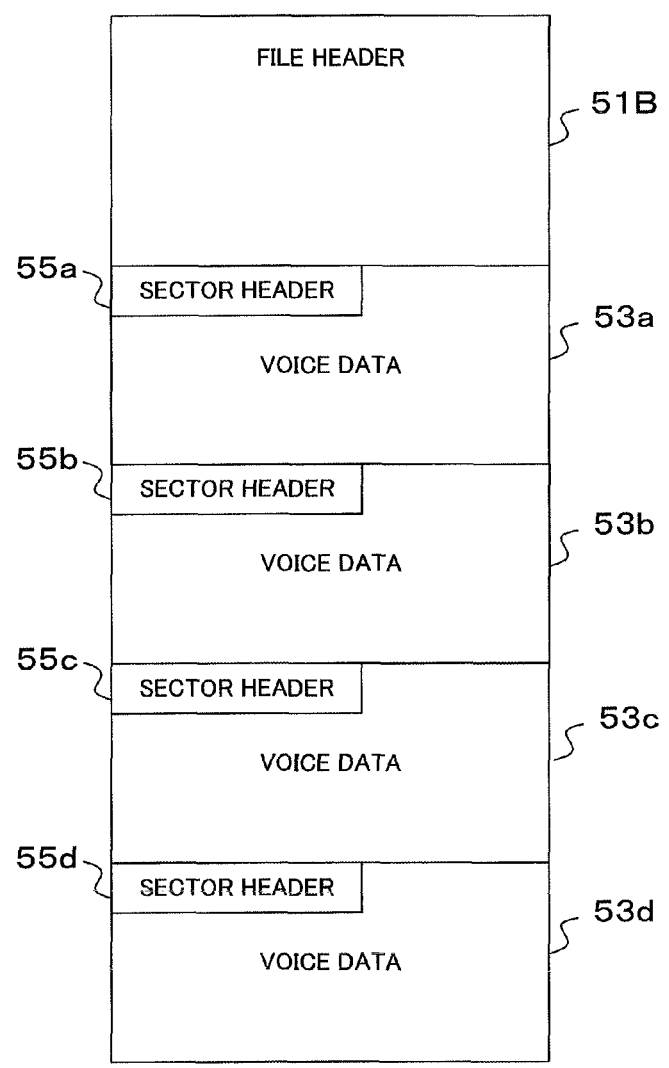
FIG. 5 is a drawing showing a voice file structure of the terminal device of the first embodiment of the present invention.

Next, the structure of the voice file will be described using FIG. 5. The example shown in FIG. 5 is for a case where falsification prevention processing has been applied. As shown in the authentication file in the lower part of FIG. 4, besides the information stored in a normal header, a hash value for determining whether or not falsification has been performed and an operation log is stored in the file header 51B.

A region (given number of bytes (for example, 6 bytes)) for writing sector headers 55a-55d is also provided in the voice data 53a-53d etc. Current time information and sequence number information (information representing the order of a sector) is stored in these sector headers 55a-55d for the purpose of increasing strength against falsification. If a file is edited, continuity of the current time information and sequence number information that has been stored in the sector headers 55a-55d is lost. Accordingly, as well as examining the hash value etc. it is also possible to determine whether or not falsification has been performed using continuity of the current time information and the sequence number information.

Next, the falsification prevention processing of the terminal device 10 of this embodiment will be described using the flowcharts shown in FIG. 6A, FIG. 6B, FIG. 7, and FIG. 8. These flowcharts are executed by the CPU within the controller 1 controlling each of the sections within the terminal device 10 in accordance with program code that has been stored in the memory within the controller 1. In the terminal device 10, since the image sensor is provided in the information input section 2 it is possible to acquire image data for a movie etc., but in the example shown in FIG. 6A and FIG. 6B description is only given for the case of acquiring voice data.

If a power supply battery is fitted into the power supply section 11 of the terminal device 10, operation of the terminal device 10 commences. Once operation commences, it is first determined whether or not a storage operation is in progress (S1). Here, the slide switch 3a within the operation section 3 has been operated and is at the recording position, and it is determined whether or not voice storage has commenced. In the event that a storage operation is in progress, in this step voice data (or image data only, or a combination of voice data and image data) is acquired.

If the result of determination in step S1 is that a storage operation is in progress, it is next determined whether or not it is a falsification prevention time (S3). Conditions for start time and end time of falsification prevention are stored in the condition storage section 4c, and the trigger section 6 starts and ends falsification prevention processing at times that coincide with the stored conditions. For example, in the event that the trigger button of the operation section 3 has been operated, falsification prevention processing is commenced.

If the result of determination in step S3 is that it is not a falsification prevention time, deletion is performed if there are deletion candidates (S9). Here it is normal storage where falsification prevention is not performed. If the fast rewind and recording operation that was described using FIG. 2A-FIG. 2C is performed, the voice data 53b and 53d of FIG. 3 become deletion candidates. In this step therefore, if there are such deletion candidates deletion is carried out. It should be noted that in actual fact, for the voice data 53b and 53d that are deletion candidates, overwriting with new voice data is performed.

Once deletion of the deletion candidates has been performed, noise removal recording is carried out and file A is created (S11). Here, since it is recording with normal processing, voice data that has been acquired using the information input section 2 and subjected to normal processing, and further subjected to noise removal processing in the ambient sound recognition section 1b is stored in a folder 4a as file A.

On the other hand, if the result of determination in step S3 is a falsification prevention time, noise removal permitted recording is carried out and resulting voice data is stored as a file A candidate (S5). Here, similarly to step S9, voice data that was acquired using the information input section 2 and subjected to normal processing, and further subjected to noise removal processing in the ambient sound recognition section 1b, or voice data that has had unnecessary portions (corresponding to voice data 53b and 53d) deleted in a case where a fast rewind and recording operation is carried out, is stored in the folder 4a as file A.

The above described voice data is stored as a file A candidate because even if there is a falsification prevention operation during recording, there are cases where ultimately a crucial moment as evidence cannot be ascertained, and so it is not always necessary to make into a file. Whether or not files before and after falsification prevention has been carried out need to be connected in this way, and whether or not they need to be made into a single file or kept and multiple files may be changed by the user later, and may also be automatically chosen as required, based on stored content and conditions etc.

Also, in parallel with noise removal permitted recording, voice data that has been subjected to falsification prevention processing together with recording without noise removal is stored as a file B candidate (S7). Here, in parallel with storage of voice data that has been subjected to noise removal processing in the folder 4a, voice data that has been acquired by the information input section 2 is subjected to falsification prevention processing by the falsification prevention section 5. Since noise removal processing is not carried out on the voice data that has been subjected to this falsification prevention processing, noise is superimposed. The voice data that has been subjected to this falsification prevention processing is stored in the folder 4b as file B. In this way, falsification prevention processing is applied to the voice data (or image data, independently, or a combination of voice data and image data) in step S7. Detailed operation of the recording and falsification prevention without noise removal in step S7 will be described later using FIG. 8.

Also, in step S47 etc. that will be described later, storage of stored operation information in the header is carried out (refer to the operation log of file B in FIG. 4). If operation information is stored in the header, it is possible to easily confirm an editing history at a later date. Also, this editing history can be of use at the time of determining whether or not falsification has been performed.

It should be noted that in the case of additionally creating a file C that was created in step S6 of FIG. 10A which will be described later in the first embodiment also, if both the file C and the file B those created in step S7 is stored in association, it is possible to reference one using the other. For example, both file names are given the same name, and information may be written to the headers etc. so that it is possible to reference the other file name. As a result, the content of voice data of file C can be known by looking at file B, and the content of voice data of file B can be known by looking at file C.

It should be noted that in step S7, in a case where falsification prevention processing is carried out and voice data is stored, the fact that falsification prevention processing has been carried out may be displayed on the display section 8. In this case, the user can confirm whether or not falsification prevention processing has been carried out by looking at this display.

In the event that a storage operation is not in progress in step S1, it is next determined whether or not the storage operation is complete (S13). In the event that a recording operation is stopped, since the slide switch of the operation section 3 has been slid to the recording stopped position, in this step determination is based on whether or not the slide switch is at the stop position.

If the result of determination in step S13 is that a storage operation is not complete, it is determined whether or not a fast rewind operation is being carried out (S15). As was described using FIG. 2A-FIG. 2C, whether or not the user has carried out a fast rewind and recording operation is determined based on whether or not the slide switch of the operation section 3 is at the fast rewind position. If the result of this determination is that fast rewind is not being carried out, processing returns to step S1.

On the other hand, if the result of determination in step S15 is that fast rewind was carried out, fast rewind is performed and when the fast rewind operation has stopped recording is resumed from that position. In this case, in the event that falsification prevention processing is applied processing is carried out so as to create file B, and in the event that falsification prevention processing is not applied processing is carried out so as to create file A (refer to FIG. 4). Detailed operation of this fast rewind will be described later using FIG. 7.

Once the processing of steps S7, S11 and S17 has been executed, processing returns to step S1 on the previously described operation is executed.

Figure 6B:
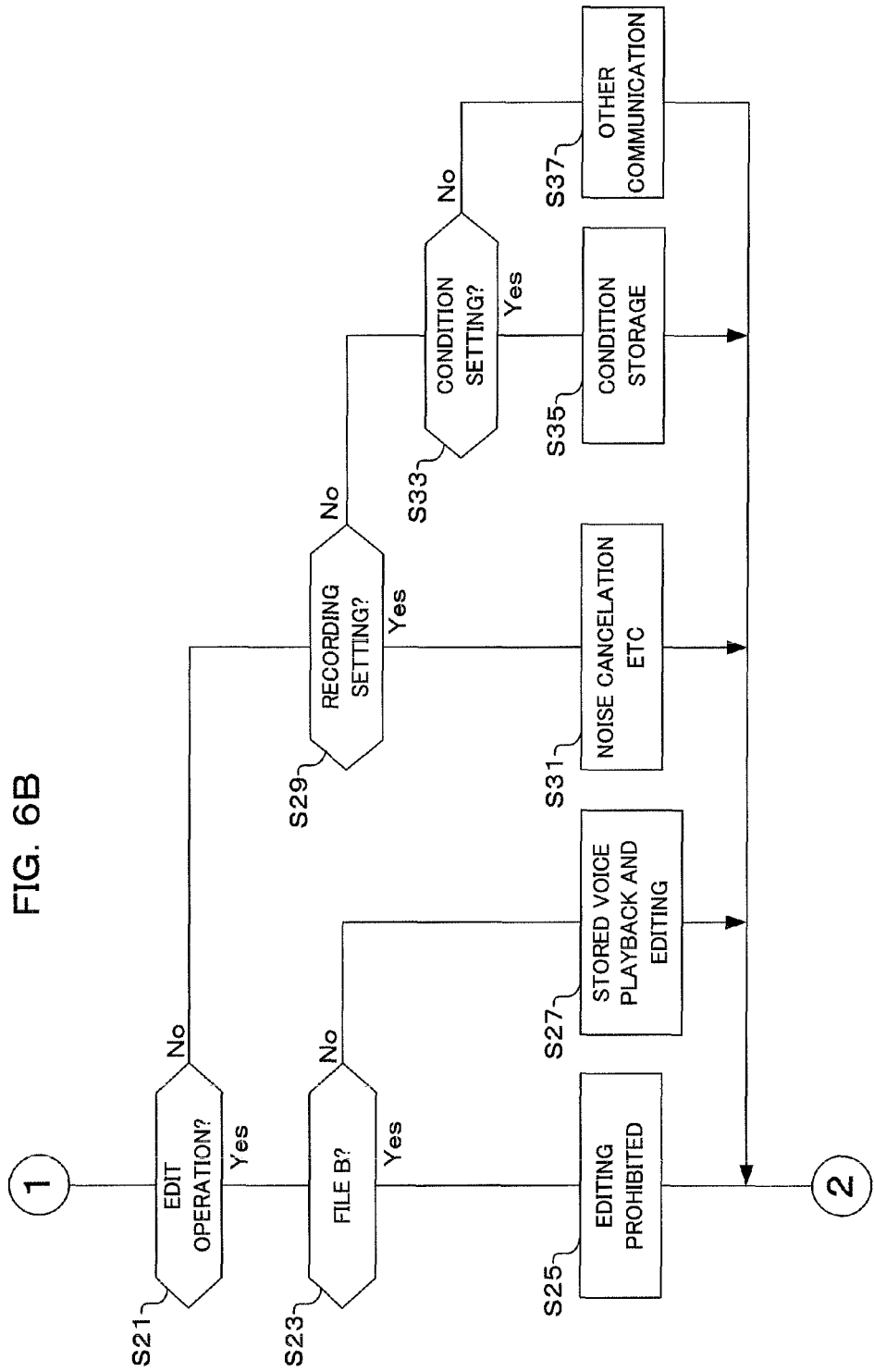

If the result of determination in step S13 is that a storage operation has been completed, it is determined whether or not editing operations have been performed (S21 in FIG. 6B). If the editing button within the operation section 3 is operated editing mode is switched to.

If the result of determination in step S21 was that there is an editing operation, it is determined whether or not file B is being designated (S23). It is determined whether or not a voice file that was designated when carrying out editing is file B, namely a file which has been subjected to falsification prevention processing.

If the result of determination in step S23 is file B, editing is prohibited (S25). In the event that falsification prevention processing has been applied falsification is not possible after recording. In order to make the user aware of this, warning display may be carried out on the display section 8. In this way, with this embodiment, execution of editing processing is prohibited for voice data etc. for which falsification prevention processing has been executed by the falsification prevention section. As a result, in the event that a fast rewind and recording operation has been carried out it is not possible to carry out editing on file B that has been created.

On the other hand, if the result of determination in step S23 is not file B, stored voice playback and editing are carried out (S27). Playback of voice for editing is made possible, and editing is carried out while listening to reproduced sound. Various everything is possible, such as deleting sections that have been designated using the operation section 3. A plurality of buttons for editing may be provided, and assigned respectively different editing functions may be assigned. Various editing may also be carried out on menu screens.

If the result of determination in step S21 is that there is no editing operation, it is determined whether or not there is recording setting (S29). Here it is determined whether or not recording setting mode is set. Recording setting mode is carried out on a menu screen, and as recording settings there are various settings such as noise cancellation setting, recording sound quality setting etc.

If the result of determination in step S29 is recording setting, recording settings such as noise cancellation is carried out (S31). Here, recording setting is carried out in accordance with setting input on the menu screen. It should be noted that in the case where noise cancellation has been set, noise removal processing is applied by the ambient sound recognition section 1*b*.

If the result of determination in step S29 is that there is no recording setting, it is determined whether or not there is condition setting (S33). As was described previously, conditions for carrying out falsification prevention processing in the trigger section 6 stored in the condition storage section 4*c*. It is determined whether or not conditions stored in this condition storage section 4*c* will be set. Condition setting is carried out on a menu screen.

If the result of determination in step S33 is conditions setting, storage of conditions is carried out (S35). Here, conditions that have been set on the menu screen are stored in the condition storage section 4*c*.

If the result of determination in step S33 is not condition setting, communication and other operations are carried out (S37). Here, for example, various processing such as a registration procedure necessary for carrying out falsification prevention processing, and acquiring an encrypted hash function necessary for carrying out falsification prevention processing from the administration device 30 etc. are carried out via the communication section 7.

Once the processing of steps S25, S27, S31, S35 and S37 has been carried out, processing returns to step S1.

In this way, with the terminal device 10 of this embodiment, if a fast rewind and recording operation is performed, fast rewind is carried out and it is possible to resume recording from the position that the fast rewind was performed to (refer to S17 and FIG. 3). Then, at the time of falsification prevention two types of file are created, namely file B which has been subjected to falsification prevention processing, and file A that has not been subjected to falsification prevention processing, and these two files are stored (refer to S5, S7 and FIG. 4). On the other hand, if it is not a falsification prevention time, files that were made deletion candidates at the time of fast rewind are deleted, and new voice data is stored (refer to S9).

Also, with the terminal device 10 of this embodiment, voice data is acquired, and at the time of falsification prevention, in parallel with subjecting the acquired voice data to normal processing and storing in a folder 4*a*, the same voice data is subjected to falsification prevention processing and stored in a folder 4*b* (refer to S5 and S7). This means that at the time of falsification prevention two sets of voice data are created for the same voice data, namely voice data that has been subjected to falsification prevention processing and voice data that has not been subjected to falsification prevention processing.

Also, with the terminal device 10 of this embodiment, after voice data acquisition, in the case of editing processing, only voice data that has not been subjected to falsification prevention processing can be edited (refer to S27). For the voice data past has been subjected to falsification prevention processing, editing processing cannot be carried out (refer to S23 and S25), and it is possible to provide voice data having high admissibility as evidence.

Next, operation of the "fast rewind and confirmation" in step S17 will be described using the flowchart shown in FIG. 7.

If this flow is entered, it is first determined whether or not there is a fast rewind operation (S41). When the user carries out a fast rewind and recording operation the slide switch of the operation section 3 is slid to the fast rewind position. In this step, determination is based on whether or not the slide switch is at the fast rewind position.

If the result of determination in step S41 is a fast rewind operation, fast rewind is carried out (S43). Here, voice data that has been stored in the memory 4 is retraced in accordance with the time for which the fast rewind operation is performed. It should be noted that at the time of fast rewind voice data is played back at various points, and a fast rewind noise like that in a old style tape recorder may be artificially generated. With this playback, it is not possible to clearly catch a voice, but it is useful in roughly determining the rewind position.

Next it is determined whether or not it is a falsification prevention time (S45). Here, similarly to S3, determination is based on whether or not falsification prevention is being carried out based on conditions that are stored in the condition storage section 4*c*.

If the result of determination in step S45 is that it is a falsification prevention time, a fast rewind operation is logged (S47). Here, information relating to the fast rewind operation, such as time that the fast rewind is started, time that the fast rewind is stopped, time that recording is resumed etc., is stored in the storage control section 1*a* etc. The falsification prevention processing may be carried out using this information (for example, used at the time of calculating has value etc.).

If the result of determination in step S41 is not a fast rewind operation, stored audio playback is carried out from the section that has been fast rewound to (S51). Here, because the user has slid the slide switch from the fast rewind position to the playback position, voice data is read out from the fast rewind position and voice playback is carried out based on this voice data. The user determines from walk position to delete voice data and whether to carry out overwriting recording while listening to this reproduced sound.

Next, sections that have not been played back are made deletion candidates (S53). If voice playback has been stopped in step S51, a region from that stop position to a position where fast rewind was started becomes a not played back section, and that section is made a deletion candidate. This not played back section corresponds, for example, to the sections of voice data 53*b* and 53*d*. Sections of the deletion candidates are deleted in previously described step S9 when voice recording is resumed.

Once the not played back sections have been made deletion candidates, it is next determined whether or not it is a falsification prevention time (S55). Here, similarly to S3 and S45, determination is based on whether or not falsification prevention is being carried out based on conditions that are stored in the condition storage section 4*c*.

If the result of determination in step S55 is that it is a falsification prevention time, not played back sections are made separate storage candidates (file B) (S57). At the time of falsification prevention, the voice data 53*b* and 53*d* corresponding to the not played back sections also remain as evidence, as shown in the evidence file (file B) in the lower part of FIG. 4. In this step, these voice data are rendered so as to be recognized as separate storage candidates. Here, voice data that has been made a separate storage candidate is separately stored at the time of resuming recording (refer to S7 in FIG. 6A).

Next, not played back sections are made deletion candidates (file A) (S59). At the time of falsification prevention, a voice file is created without using the voice data 53*b* and 53*d* corresponding to the not played back sections, as shown in the edit file (file A) in the upper part of FIG. 4. In this step, these voice data can be identified as deletion candidates.

Here, voice data that has been made a deletion candidate is deleted at the time of resuming recording (refer to S5 in FIG. 6A).

If the not played back sections have been made deletion candidates in step S59, or if the result of determination in steps S55 and S45 was that it is not a falsification prevention time, or if logging of a fast rewind operation has been carried out in step S47, the originating flow is returned to.

In this way, in the flow for fast rewind confirmation, if a fast rewind operation is stopped voice playback is carried out (S51), and sections that the user has decided will be deleted are made deletion candidates (S53, S59). At the time of falsification prevention, two types of file, namely file A and file B, are created, which dispense with the need to listen to unnecessary audio according to the requirements of the respective voice files, and it is possible to determine whether or not there is an editing operation (S57 and S59).

Also in the flow for fast rewind confirmation, at the time of falsification prevention, and if fast rewind is in progress, information relating to the fast rewind operation is stored (S47). If a hash value for falsification prevention is created also using this information, it is possible to carry out falsification prevention with higher reliability. It should be noted that in FIG. 7 only information during fast rewind is stored, but if information relating to times relating to not played back sections (for example, times t2, t3, t3 etc. in FIG. 3) is stored reliability of falsification prevention is increased.

Next, operation of the "recording and falsification prevention without noise removal" in step S7 will be described using the flowchart shown in FIG. 8.

If this flow is entered, first of all voice A/D is carried out without noise removal. Here, noise removal processing is not carried out by the ambient sound recognition section 1b on voice data that has been input by the information input section 2, and the A/D within the controller 1 subjects the voice data that has not been subjected to noise removal processing to A/D conversion.

Next, compression is carried out (S63). Here, the voice compression circuit within the controller 1 carries out compression processing on the voice data that was subjected to A/D in step S41.

If compression processing has been carried out, hash function calculation is carried out based on the data that has been acquired at this time (S65). Obviously, since it is important audio, compression is not always necessary. Here a hash function is calculated for a given quantity of voice data (for example, voice data of one sector). This hash function may be encrypted based on the data that was acquired from the administration device 30 in step S37. If this data is acquired from the administration device 30 every time falsification prevention then reliability will become high, but these processes may be appropriately reduced or increased in accordance with requested level of falsification prevention and requested level of electronic signature. In the encryption the user's biological information etc. may be used, and data for encryption may be generated by a dedicated circuit. If the hash function has been calculated, the originating flow is returned to.

Figure 8:
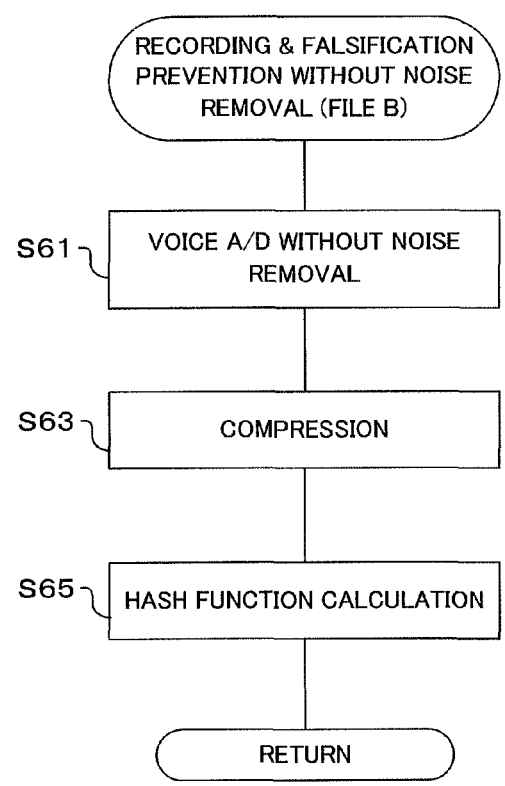
FIG. 8 is a flowchart showing operation for "recording and falsification prevention without noise removal" of the terminal device of the first embodiment of the present invention.

In this way, with the first embodiment of the present invention, at the time of falsification prevention, in a case where an editing operation such as a fast rewind and recording operation has been carried out, voice data for sections to be deleted also remains in the voice file, and falsification prevention processing is applied to the voice file that also contains this remaining voice data (refer to file B in FIG. 4, S7 in FIG. 6A, S57 in FIG. 7, and FIG. 8). By carrying out a fast rewind and recording operation, it is possible to delete some of the recorded voice data, but with this embodiment this kind of voice data is also stored and since falsification prevention processing is carried out it is possible to obtain an extremely high reliability.

Also, with this embodiment, in the case where voice data (Or may be image data, independently, or a combination of voice data and image data. Abbreviated to "voice data etc.") that has been obtained using the information input section becomes a deletion candidate as a result of an editing operation using the operation section 3 (refer to S59 in FIG. 7), falsification prevention processing by the falsification prevention section 5 is applied to data that contains voice data constituted by this deletion candidate (refer to S7 in FIG. 6A). As a result it becomes possible to carry out falsification prevention while performing editing, even in a case where storage of voice data etc. is carried out.

Also, an editing operation of this embodiment is an operation whereby rewind is performed to a storage position of stored voice data etc. that has been temporarily acquired by the information input section 2, and voice data etc. is overwritten from this storage position that has been rewound to, and deletion candidates are voice data etc. of the overwritten sections. This editing operation is an operation that has been described as a fast rewind and recording operation, and is useful because when performing dictation etc. recorded sections can be edited simply.

Also, with this embodiment, there is a determination section that determines whether or not the falsification prevention processing has been applied by the falsification prevention section (for example, S3 in FIG. 6A etc.). When it has been determined by this determination section that falsification prevention processing has not been applied (for example, No at S3 in FIG. 6A), a file is created that has voice data etc. that constitutes deletion candidates deleted (for example, S11 etc. in FIG. 6A). As a result, since the file having the deletion candidates deleted is created, at the time of playback and necessary data is not played back and confirmation is simple.

Also, with this embodiment, in the event that it has been determined by the determination section that falsification prevention processing has been applied (for example, Yes at step S3 in FIG. 6A), a first file (file A) that has been created by deleting voice data and/or image data constituting deletion candidates within voice data etc. that has been acquired by the information input section 2, and a second file (file B) in which data, that also includes voice data etc. constituting deletion candidates within voice data etc. that has been acquired by the information input section 2, has been subjected to falsification prevention processing by the falsification prevention section 5, are created. As a result, since the first file that has unnecessary portions deleted and is easy to listen to, and the second file that has been subjected to falsification prevention with high reliability, are created at the same time the respective files can be used appropriately in accordance with usage.

Next, a second embodiment of the present invention will be described using FIG. 9 to FIG. 14. With the first embodiment, a file on which falsification prevention processing was performed was file B that also included deleted voice data. Conversely, with this embodiment, falsification prevention processing is also carried out for file A, which has the necessary sections deleted from the voice data, to create and store file C.

The structure of this embodiment is the same as FIG. 1 for the first embodiment, and so detailed description has been omitted. It should be noted that with this embodiment, the controller 1 functions as a controller for, in a case where voice data and/or image data that has been acquired using the information input section have become candidates for deletion as a result of editing operations using the operation members, applying falsification prevention processing using the falsification prevention section to data after the voice data and/or image data these constitute the candidates for deletion have been deleted.

Figure 9:
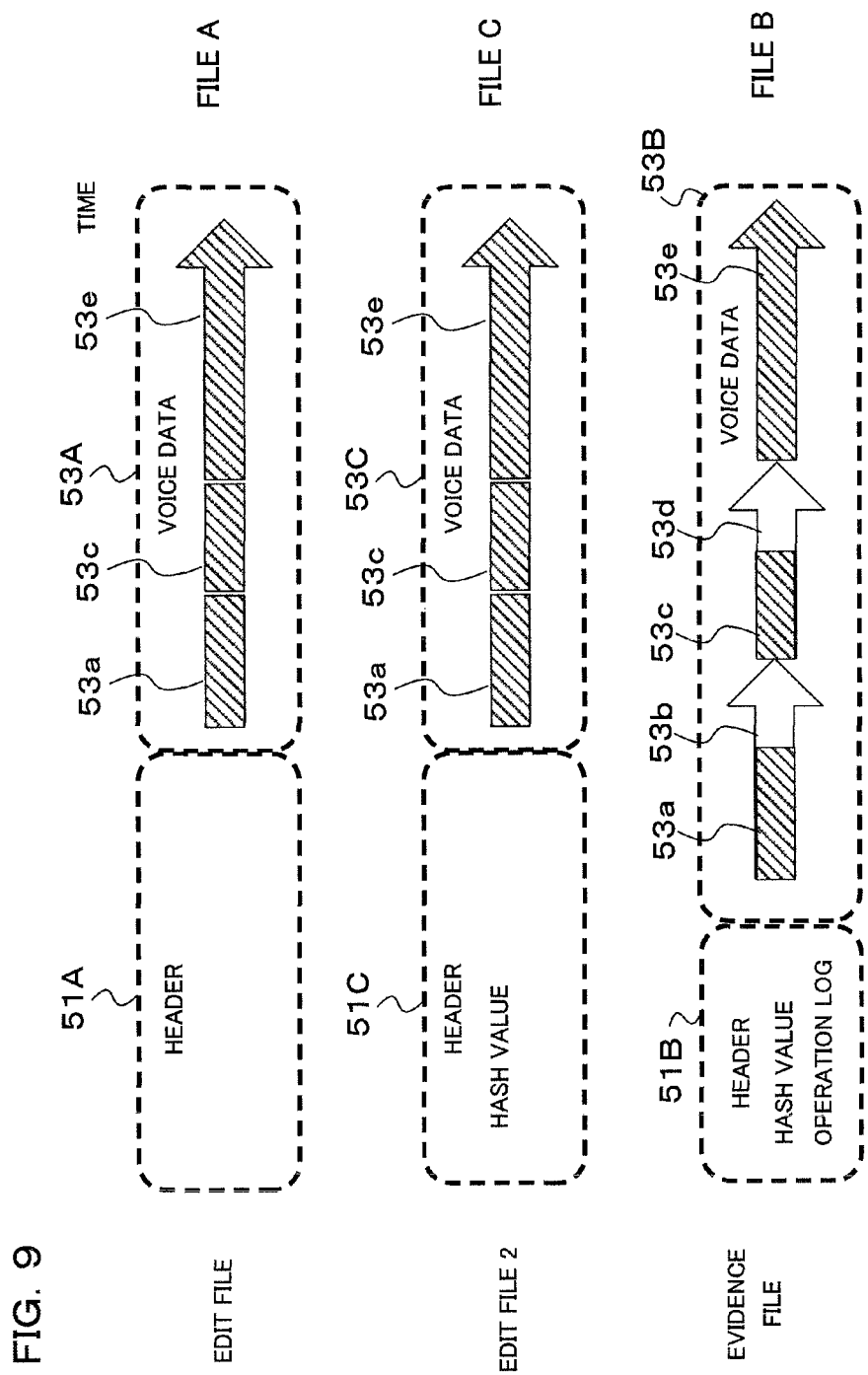
FIG. 9 is a drawing for describing a voice file of the terminal device of a second embodiment of the present invention.

Next, three types of voice file that are stored in this embodiment will be described using FIG. 9. In the first embodiment two voice files were created, namely file A and file B. With this embodiment however, as shown in FIG. 9, in addition to file A and file B, file C is created. In the event that falsification prevention processing has not been designated, then similarly to the first embodiment file A for editing is created. On the other hand, in the events that falsification prevention processing has been designated, then in addition to the evidence file B, file C is created as edit file 2.

In File C, voice data 53C the same as in file A, comprising voice data 53a, 53c and 53e, with overwritten voice data 53b and 53d having been deleted. Also, besides information that is written to a normal header, a hash value for determining whether or not falsification has been carried out is stored in the header 51C. This hash value is generated by an operation after editing, and stored. It should be noted that with the file C also, operation information may be written to the header. In this case, by reading operation information from the header etc. it is possible to verify an editing history, and it can also be used at the time of determining whether or not falsification has been performed.

Next, the falsification prevention processing of the terminal device 10 of this embodiment will be described using the flowcharts shown in FIG. 10A, FIG. 10B, and FIG. 11. These flowcharts are executed by the CPU within the controller 1 controlling each of the sections within the terminal device 10 in accordance with program code that has been stored in the memory within the controller 1. As with the first embodiment, since the image sensor is provided in the information input section 2 it is possible to acquire image data for a movie etc., but in the example shown in FIG. 10A and FIG. 10B description is only given for the case of acquiring voice data.

Figure 10A:
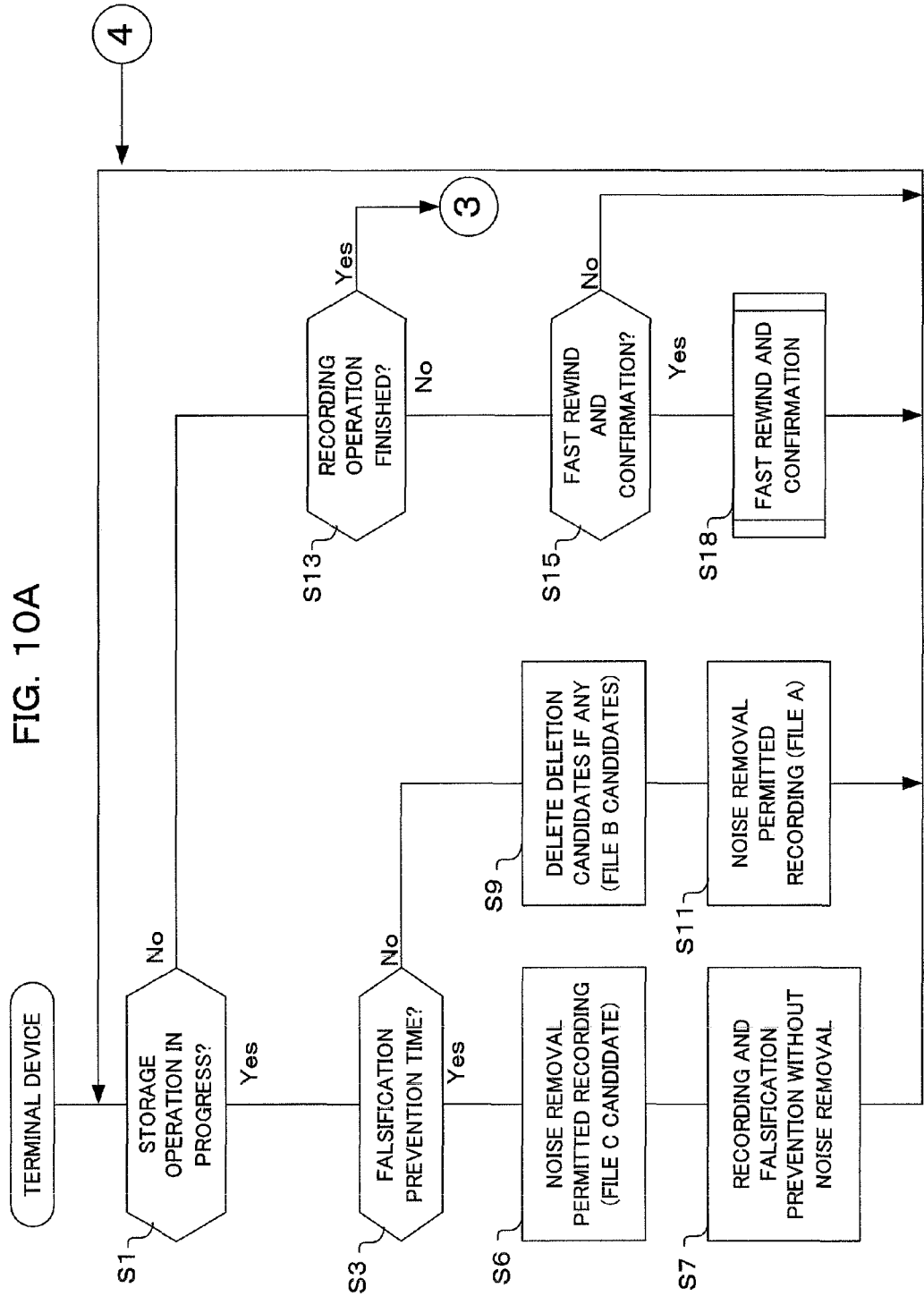
FIG. 10A and FIG. 10B are flowcharts showing operation of the terminal device of the second embodiment of the present invention.
Figure 10B:
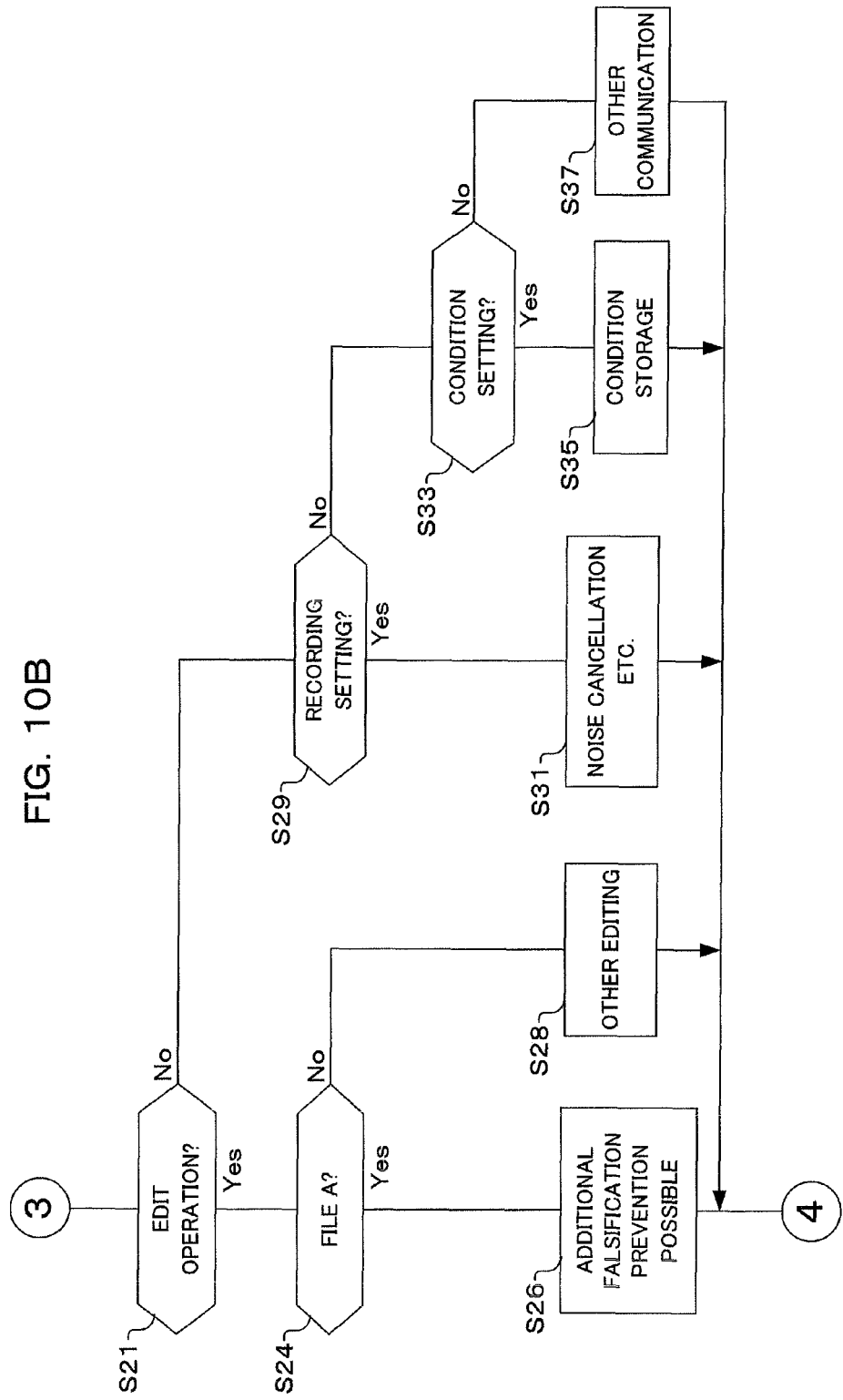

Compared to the flowcharts of FIG. 6A and FIG. 6B for the first embodiment, the main flow of the terminal device show in FIG. 10A and FIG. 10B is the same apart from the fact that steps S5, S17, S23, S25 and S27 are replaced with steps S6, S18, S24, S26 and S28, and so description will focus on these points of difference.

If the result of determination in step S1 is that a recording operation in progress, the result of determination in step S3 is falsification prevention time, and noise removal is permitted, then noise removal permitted recording is carried out and file C candidates are generated (S6). Here, noise removal is carried out, and recording to generate file C shown in the middle of FIG. 9 is carried out. Here, together with removal of noise, sections that have been made deletion candidates in the fast rewind and confirmation of step S18 (refer to S58 to in FIG. 11) are deleted and a hash value is calculated.

Also, noise removal permitted recording is carried out in step S6, and in parallel with generating file C candidates in step S7 recording and falsification prevention are carried out without noise removal (S7). Processing here is the same as for the first embodiment, and file B candidates are generated.

Also, similarly to the first embodiment, in step S7 storage of stored operation information etc. in the header is carried out (refer to the operation log of file B in FIG. 9). If operation information is stored in the header, it is possible to easily confirm an editing history at a later date. Also, this editing history can be of use at the time of determining whether or not falsification has been performed. Also, as was also described for the first embodiment, by storing both the file C that was created in step S6 and the file B that was created in step S7 in association with each other, it is possible to reference one using the other.

If the result of determination in step S3 is that it is not a falsification prevention time, file A is created in steps S9 and S11. Since processing here is the same as the first embodiment, detailed description is admitted.

If the result of determination in step S1 is that a storage operation is not in progress, it is determined whether or not the storage operation is complete (S13), if the result of this determination is that the storage operation is not complete it is determined whether or not to perform fast rewind and confirmation (15), and if the result of this determination is fast rewind then fast rewind and confirmation are carried out (S18). In the second embodiment, file B and file C are created at the time of falsification prevention, and file A this created when it is not a falsification prevention time. In the fast rewind and confirmation of step S18, processing for creating these files is executed, as will be described later using FIG. 11.

If the result of determination in step S13 is that the storage operation is completed, it is determined whether or not there is an editing operation (S21), and if the result of this determination is that there is an editing operation it is determined whether or not there is file A (S24). If the result of this determination is that there is file A, additional falsification prevention is made possible (S26). Here, playback of recorded voice is enabled, and it is possible for the user to carry out various editing of voice files, such as deleting files etc.

On the other hand, if the result of determination in step S24 is that there is not a file A, there will be a file B and a file C that have been subjected to falsification prevention processing. In this case other editing is enabled (S28). Here, in the case of voice data it has been subjected to falsification prevention processing, editing is possible if particular application software is used. In this case it is not a problem since a history remains even if editing operations are carried out. In this step playback of recorded voice etc. may also be carried out.

If the result of determination in step S21 is that there is not an editing operation, steps S29 and after are executed, but since this processing is the same as that in FIG. 6B relating to the first embodiment, detailed description is omitted.

In this way, with the main flow for the terminal device of the second embodiment, in a case where a fast rewind and recording operation has been performed, voice data that also includes voice data of sections that have been deleted (for example, voice data 53b and 53d in FIG. 9) is stored, and file B in which these voice data have been subjected to falsification prevention processing is created (S7 in FIG. 10A). Also, at the time of falsification prevention, in parallel, voice data of necessary sections (for example, voice data 53b and 53d in FIG. 9) is deleted, voice data for only the voice data of required sections (for example, voice data 53a, 53c and 53e in FIG. 9) is stored, and file C in which these voice data have been subjected to falsification prevention processing is created (S6 FIG. 10A). As a result, file B having extremely high admissibility as evidence and file C which has inferior admissibility as evidence but is easy to listen to at the time of voice playback, are created.

Next, operation of the "fast rewind confirmation" in step S18 will be described using the flowchart shown in FIG. 11.

Figure 11:
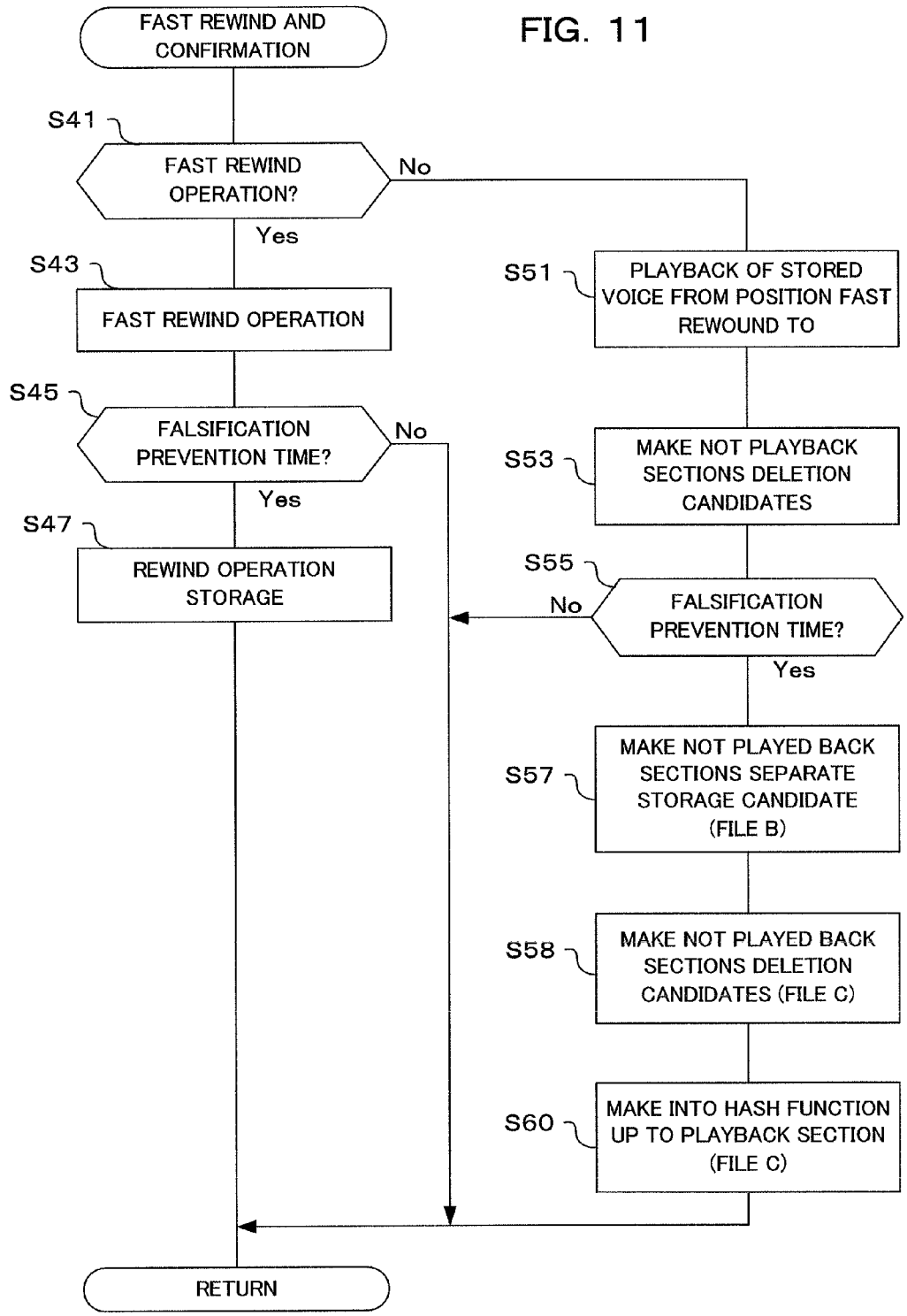
FIG. 11 is a flowchart showing "fast rewind and confirmation" operation of the terminal device of the second embodiment of the present invention.

Compared to the flowchart of FIG. 7 for the first embodiment, the flow for the fast rewind and confirmation shown in FIG. 11 is the same apart from the fact that step S59 is replaced with steps S58 and S60, and so description will focus on these points of difference.

If the result of determination in step S41 is that a fast rewind operation has been completed, recorded voice is played back (S51), not played back sections are made deletion candidates (S53), and if it is a falsification prevention time (Yes in S55) not played back sections are made separate storage candidates (S57). Here, voice data that has been made a separate storage candidate is subjected to falsification prevention processing together with being created as a voice file in step S7.

Next, sections that have not been played back are made deletion candidates (S58). As was described using FIG. 9, with file C not played back sections are deleted and a voice file is created. Here it is made possible to recognize that there is a deletion candidate. A voice file that has been made a deletion candidate is deleted in step S6.

Next, a playback section is subjected to a hash function (S60). Here, at the time of fast rewind, sections that have been subjected to voice playback are made into hash functions, and file C is generated.

If the playback sections have been made in to hash functions in step S60, or if the result of determination in steps S55 and S45 was that it is not a falsification prevention time, or if fast rewind operation and storage has been carried out in step S47, the originating flow is returned to.

In this way, with this embodiment also, in the flow for fast rewind confirmation, if a fast rewind operation is stopped voice playback is carried out (S51), and sections that the user has decided will be deleted are made deletion candidates (S53, S59). Also, at a falsification prevention time, since the two files file B and file C are used, identification is possible at the time of creating the respective voice files (S57 and S58).

Also, with this embodiment, a hash value is stored in a header, and is reused at the time of edit recording. Specifically, at the time of the user creating a sentence file editing is permitted, and after completion of dictation etc. it is made forbidden to perform falsification. That is, even in a case where falsification prevention is affected, there is no remaining voice data that has been determined by the user to be unnecessary at the time of recording. Also, by storing hash values that have been calculated from a head during edit recording of the voice data, in a case where overwriting recording has been performed from midway through a file by fast rewinding, it is possible to reduce calculation amount by the controller (CPU) by reusing hash values that are stored in a file header of the data just before overwriting, and it is possible to shorten the calculation time.

Next, the structure of the voice file will be described using FIG. 12. The voice file 60 is made up of voice data 61 and associated file information 62. The voice data 61 is acquired using a microphone of the information input section 2 and is data that has been subjected to voice processing, including both voice data that has been subjected to falsification prevention processing and voice data that has not been subjected to falsification prevention processing. Also, with the files A-C that were described using FIG. 9, the headers 51A-51C and the voice data 53A-53C correspond to the voice data 61 in FIG. 12.

The associated image file name 63 is stored in association with image data that is stored at the same time during storage of the voice data 61. The associated voice file name stores an associated voice file name. By making it possible to know of associations between files that have falsification prevention and files with no falsification prevention it becomes possible to search for either file from the other file, and handling becomes simple. An encryption hash section 65 encrypts and stores a hash function at the time of carrying out falsification prevention processing. As was described previously, even if falsification prevention processing is carried out a file would be falsified if a hash function is known, and performing encryption is to prevent this.

If there is an administration device, official institutions and independent organizations provide structures for management and practical use of private keys and public keys, and it is possible to make structures for falsification prevention and electronic signatures having high reliability as systems. Data for carrying out falsification prevention processing is acquired from the administration device 30, and the administration device address name 66 stores an address of this administration device 30 on a network. The vice management information 67 stores time and sat information and position information etc. for when the voice data was stored. A position detection section such as a GPS (Global Positioning System) is provided within the terminal device 10, and the position information is detected by this position detection section.

Figure 12:
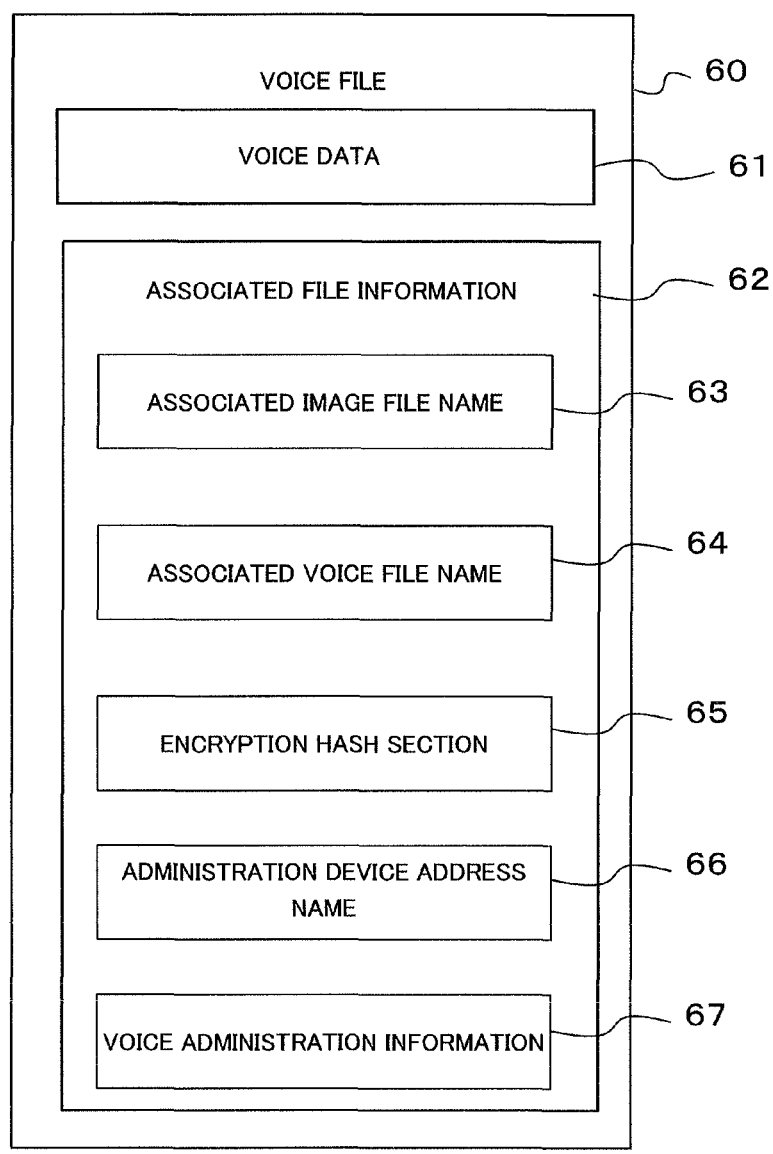
FIG. 12 is a drawing showing the structure of a voice file of the terminal device of the second embodiment of the present invention.

It should be noted that while an image file is not shown in FIG. 12, in a case where image data is acquired using the image sensor and stored, then similarly to the voice file an image file may be created and stored.

Figure 13:
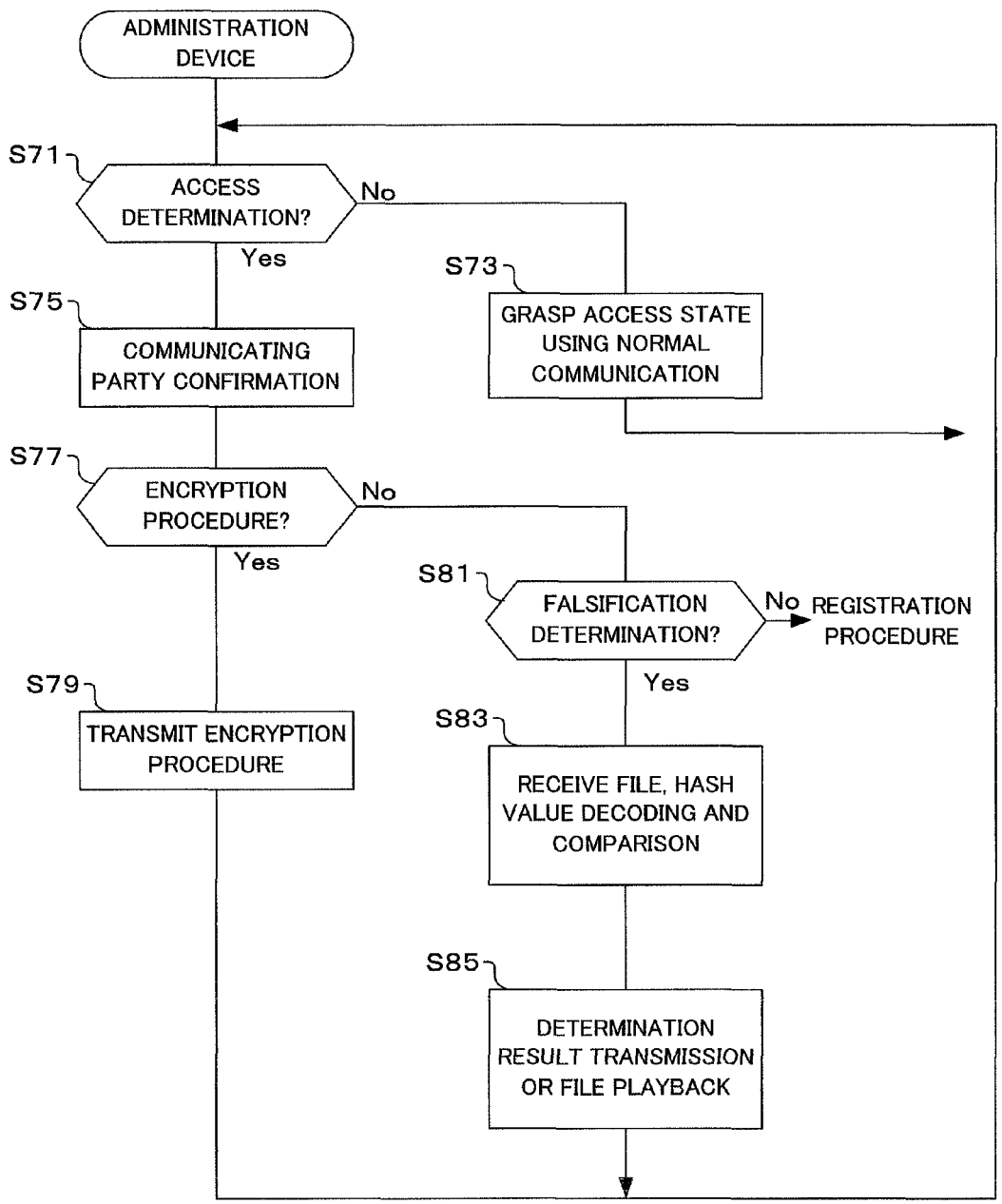
FIG. 13 is a flowchart showing operation of an administration device of the second embodiment of the present invention.

Next, operation of the administration device 30 of this embodiment will be described using the flowchart shown in FIG. 13. This flowchart is executed by the CPU within the controller 31 controlling each of the sections within the administration device 30 in accordance with program code that has been stored in the memory within the controller 31. It should be noted that in the first embodiment also the administration device 30 may operate in accordance with this flowchart.

If this flow is entered, first access determination is carried out (S71). Here, it is determined whether or not there has been access to the administration device 30 via the communication section 7 of the terminal device 10 or the communication section 23 of the external device 20. If the result of this determination is that there has not been access, an access state with steady communication is grasped (S73). Here, whether or not there is access from terminal devices 10 or external devices 20 is continuously monitored.

If the result of determination in step S61 is that there is access, the communicating party is confirmed (S75). Here, it is specified whether a device that has performed access is one of multiple terminal devices 10 or external devices 20.

Once the communicating party has been confirmed, it is next determined whether or not there is an encryption procedure (S77). As was described previously, in order to increase reliability of the falsification prevention processing, encryption processing is made possible on data for falsification prevention. In this step it is determined whether or not transmission of data for an encryption procedure has been requested.

If the result of determination in step S77 is that there is an encryption procedure, encryption procedure transmission is carried out (S79). Here, the data for carrying out encryption is transmitted to the communicating party that was confirmed in step S75. Once transmission of encryption procedure has been carried out, processing returns to step S71.

If the result of determination in step S77 is that there is not an encryption procedure, it is determined whether or not there has been a request for falsification determination (S81). There may be situations where a determination request for whether or not voice data and/or image data has been falsified is issued from the external device 20. Here it is determined whether or not this request has been received.

If the result of determination in step S81 is that a falsification determination request has been issued, a file is received and hash value decoding and comparison are carried out (S83) Here, voice data and/or image data are transmitted from the external device 20, a hash value that has been encrypted is decoded, comparison is made with an original hash value and it is determined whether or not there has been falsification. If there is falsification, not only the hash value itself, but also digest information having contents such as an encoded hash value, and electronic signatures, do not match, and so it is possible to carry out falsification determination. If a secret key is also required at the time of encrypting an electronic signature, cryptanalysis also becomes difficult.

Next, a determination result is transmitted or a file is played back (S85). Here, voice or a movie that has been played back has not been falsified and so may be used in circumstantial evidence etc., and can be reliably utilized at the time of important situational assessment, such as litigation and contracts. Here, a determination result for step S83 is transmitted to the external device 20 of the communicating party. Once the processing of step S85 has been carried out, processing returns to step S71.

If the result of determination in step S81 is not falsification determination, processing for registration procedures etc. is carried out. This registration procedure involves registering a target device in an official institution or the like, receiving various services for encryption and electronic signature, and carrying out agreements that will be beneficial for the services. Obviously services to stringently manage intended voice and movies are possible. As was described previously the terminal device 10 issues a request for transmission of data used in falsification prevention to the administration device 30 every time falsification prevention processing is carried out, and so the administration device 30 executes processing accordingly.

In this way the administration device 30 transmits data for falsification prevention to the terminal device 10, in the case where encryption procedures have been requested transmits data for that, and in the case where falsification determination has been performed transmits determination results.

Figure 14:
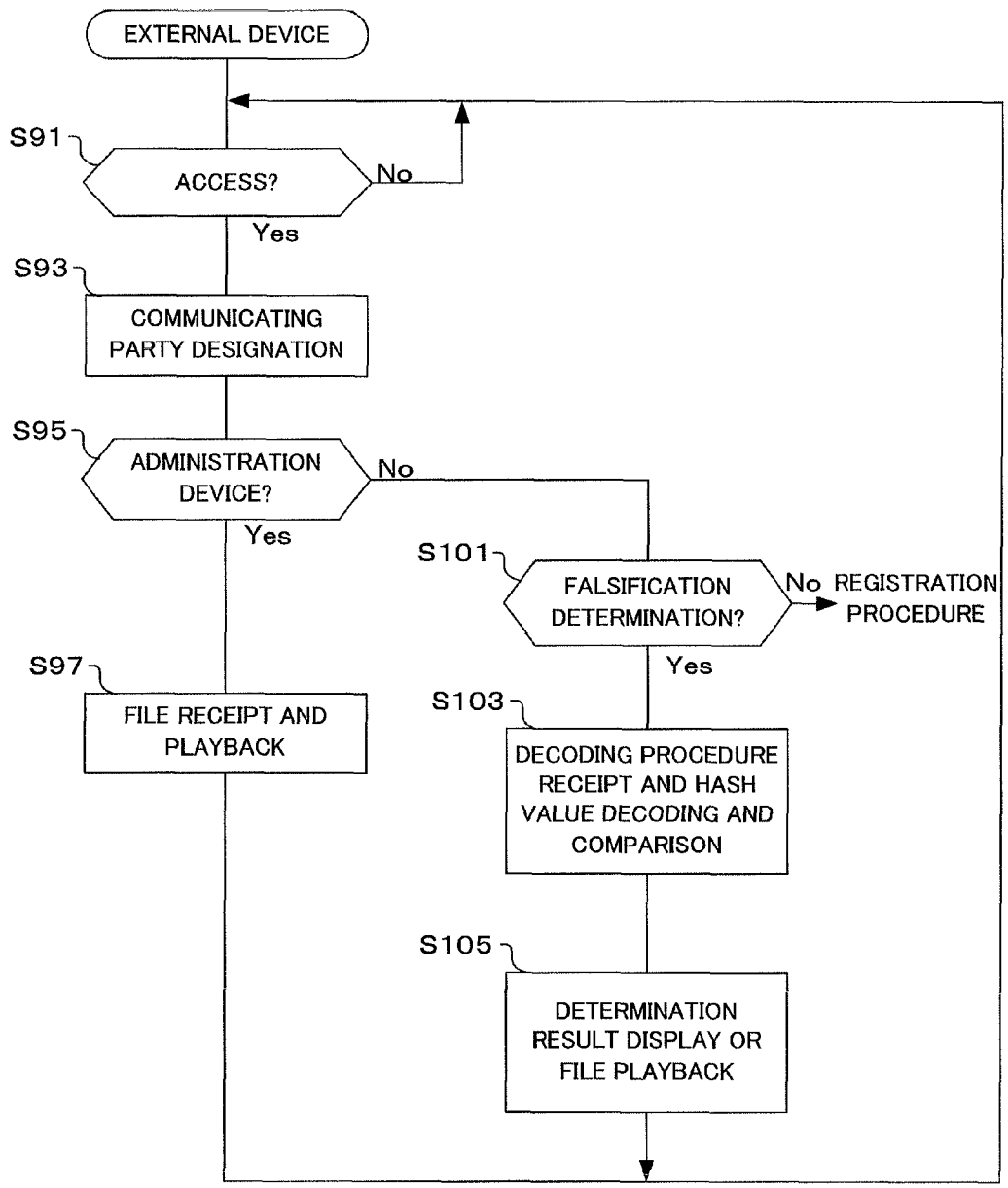
FIG. 14 is a flowchart showing operation of an external device for the second embodiment of the present invention.

Next, operation of the external device 20 of this embodiment will be described using the flowchart shown in FIG. 14. This flowchart is executed by the CPU within the controller 21 controlling each of the sections within the external device 20 in accordance with program code that has been stored in the memory within the controller 21. It should be noted that in the first embodiment also the external device 20 may operate in accordance with this flowchart.

If this flow is entered, it is first determined whether or not access is carried out (S91). Here, it is determined whether or not there has been access to the external device 20 via the communication section 7 of the terminal device 10 or the communication section 23 of the external device 20. If the result of this determination is that access has not been carried out, whether or not access is carried out is continuously determined.

If the result of determination in step S91 is access is carried out, the communicating party is designated (S93). Here, either one of multiple terminal devices 10, or an administration device 30 is designated.

Once the communicating party has been designated, it is next determined whether or not the designated party is an administration device 30 (S95). If the administration device is managed by a third party, it can be expected to result in a fairer falsification prevention system in situations such as contracts, lawsuits or the like between two parties. Here it is determined whether or not there is an administration device 30 in a case where falsification determination has been requested to the administration device 30 in S81 in FIG. 13.

If the result of determination in step S95 is administration device, a file is received and played back (S97). Here, a file is received based on determination results for falsification prevention from the administration device 30, and played back. Data that has been falsified as a result of this type of arrangement to begin with may be made incapable of being played back. Once the processing of step S97 has been carried out, processing returns to step S91. It should be noted that playback may be carried out in the administration device.

On the other hand, if the result of determination in step S95 is not administration device, it is next determined whether or not there is falsification determination (S101). Besides requesting to be administration device, falsification determination may also be executed within the external device 20 if there is information relating to decoding procedures for the determination.

If the result of determination in step S101 is falsification determination, decoding procedures are received, hash values are decoded and compared, and presence or absence of falsification is determined based on the results of this comparison (S103).

If the determination as to whether or not there is falsification has been performed in step S103, a determination result is displayed, or a file is played back (S105). Here, display is carried out such as "no falsification" or "there is falsification" based on the result of determination in step S103. Once this processing has been carried out, processing returns to step S91.

If the result of determination in step S101 is not falsification determination, the above described processing for registration procedures is carried out. Specifically, this registration procedure involves registering intended recording devices, video recording devices and users with official institutions and third-party institutions etc., receiving various services such as delivery of private keys for encryption and electronic signatures in accordance with those devices and users, and carrying out of agreements that will be beneficial. Obviously services that stringently relate to contents such as intended voice or video are also possible, and providing safekeeping and warranty etc. is also possible.

In this way, in the external device 20 it is possible to confirm whether or not voice data and/or image data that has been stored in the terminal device 10 has been falsified.

Thus, in the second embodiment of the present invention in a case where voice data etc. that has been acquired using the information input section 2 becomes a deletion candidate as a result of editing operations using the operation section 3 (for example, S58 in FIG. 11), falsification prevention processing is applied by the falsification prevention section 5 for data after this voice data etc. constituting a deletion candidate has been deleted (S6 in FIG. 10A). As a result, the reliability as to whether or not data that has had unnecessary portions deleted has been subjected to falsification prevention becomes high.

Also, with this embodiment, in the event that it has been determined by the determination section that falsification prevention processing has been applied (for example, Yes at step S3 in FIG. 10A), a second file (file B) for which falsification prevention processing has been applied by the falsification prevention section 5 to data that also contains voice data constituting deletion candidates within voice data etc. that has been acquired by the information input section, and a third file (file C) for which falsification prevention processing has been by the falsification prevention section 5 after being created by deleting voice data etc. constituting deletion candidates within voice data etc. that has been acquired by the information input section 2, are created. As a result, for a file that has unnecessary portions deleted, and a file that does not have the necessary portions deleted, it is possible to increase the reliability of both files not being falsified.

As has been described above, in each of the embodiments of the present invention, even in a case where there is editing, such as a fast rewind and recording operation, while storing voice data and/or image data, falsification prevention processing is applied. As a result, it becomes possible to create data files having high reliability with respect to not having been falsified.

It should be noted that while, with each of the embodiments of the present invention, the fast rewind and recording operation has been performed using operation of a slide switch all the operation section 3, this is not limiting and the operation may be carried out using other operation members such as buttons etc. Also, as an editing operation, an example of a fast rewind and recording operation has been described, but this is not limiting, and it is possible to apply the present invention as long as an editing operation is carried out during storage of data. Also, two types of file have been created at the time of falsification prevention (for example, Yes in S3 of FIG. 6A and FIG. 10A), but this is not limiting and only a single file may be subjected to falsification prevention processing, and it is also possible to create three files, namely file A-file C.

Also, with each of the embodiments of the present invention, when applying falsification prevention a registration procedure is carried out in the administration device 30 every time, but depending on the contract with the administration device 30 this procedure need not be performed every time. Also, encryption processing has been applied in order to increase reliability of the falsification prevention processing but this encryption processing may be omitted.

Also, in each of the embodiments of the present invention, the falsification prevention section 5, trigger section 6 etc. are constructed separately from the controller 1, but some or all of these sections may be constituted by software, and executed by a CPU within the controller 1. Also, each of the sections within the terminal device 10, external device 20 and administration device 30 may be constituted by hardware circuits and the simple devices, or may be constituted by software using the CPU and the program, and may also be constituted using a DSP (Digital Signal Processor). Suitable combinations of these approaches may also be used.

Also, it will each of the embodiments of the present invention an IC recorder has been used in describing a terminal device, but this is not limiting, and as a device for voice recording or image recording it is also possible to use a digital camera, video camera, a movie camera, a camera for movie use such as a monitoring camera, and further to use an information storage device that is built into a mobile phone, smart phone, mobile information terminal, personal computer (PC), tablet type computer, game console etc. In any event application of the present invention these not limited to the fields of consumer products, industrial products or medical use, as long as it is a system or device for information storage that has a falsification prevention function.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An information storage device, comprising:
an information input device for acquiring voice data and/or image data;
a falsification prevention circuit that subjects voice data and/or image data to falsification prevention processing;
operation members for carrying out editing operations on the voice data and/or image data; and
a controller for creating an editing evidence file that gives a history of editing operations on the voice data and/or image data, based on editing operations using the operation members, wherein:
the editing operations are operations to return to a storage position of the voice data and/or image data that has been temporarily acquired by the information input device and stored, and overwriting voice data and/or image data from that storage position that has been returned to, and
the history of the editing operations is time when an operation to return to a storage position was carried out, and/or time when overwriting was performed.

2. The information storage device of claim 1, wherein:
in the editing evidence file sector headers are created for every data section that has been added by the editing operations, and time editing was carried out and/or sequence number information of data sections is stored in the sector headers.

3. An information storage device, comprising:
an information input device for acquiring voice data and/or image data;
a falsification prevention circuit that subjects the voice data and/or image data to falsification prevention processing;
operation members for carrying out editing operations; and
a controller that, in a case where the voice data and/or image data that has been acquired using the information input section have become deletion candidates as a result of editing operations using the operation members, applies falsification prevention processing using the falsification prevention circuit to data that contains voice data and/or image data that constitute the deletion candidates, wherein:
the editing operations are operations to return to a storage position of the voice data and/or image data that has been temporarily acquired by the information input device and stored, and overwriting voice data and/or image data from that storage position that has been returned to, and the deletion candidates are voice data and/or image data of section where the overwriting is performed.

4. The information storage device of claim 3, further comprising:
a determination section that determines whether the falsification prevention processing is applied by the falsification prevention circuit, and
when the determination section determines that the falsification prevention processing is not applied, the controller creates a file from which voice data and/or image data constituting the deletion candidates has been deleted.

5. The information storage device of claim 3, further comprising:
a determination section that determines whether the falsification prevention processing is applied by the falsification prevention circuit, and
when the determination section determines that the falsification prevention processing is applied, the controller creates:
a first file by deleting voice data and/or image data constituting the deletion candidates from voice data and/or image data that has been acquired using the information input device, and
a second file, in which falsification prevention processing has been applied by the falsification prevention circuit to data containing voice data and/or image data constituting the deletion candidates, among voice data and/or image data that has been acquired using the information input device.

6. An information storage device, comprising:
an information input device for acquiring voice data and/or image data;
a falsification prevention circuit that subjects the voice data and/or image data to falsification prevention processing;
operation members for carrying out editing operations; and
a controller that, in a case where the voice data and/or image data that has been acquired using the information input section have become deletion candidates as a result of editing operations using the operation members, applies falsification prevention processing using the falsification prevention circuit to data that contains voice data and/or image data that constitute the deletion candidates, wherein:
the controller, further, in a case where voice data and/or image data that has been acquired using the information input section have become deletion candidates as a result of editing operations using the operation members, applies falsification prevention processing using the falsification prevention to data after voice data and/or image data that constitute the deletion candidates has been deleted.

7. The information storage device of claim 6, wherein:
the editing operations are operations to return to a storage position of the voice data and/or image data that has been temporarily acquired by the information input device and stored, and overwriting voice data and/or image data from that storage position that has been returned to, and the deletion candidates are voice data and/or image data of sections where the overwriting is performed.

8. The information storage device of claim 6, further comprising:
a determination section that determines whether the falsification prevention processing is applied by the falsification prevention circuit, and
when the determination section determines that the falsification prevention processing is not applied, the controller creates a file from which voice data and/or image data constituting the deletion candidates has been deleted.

9. The information storage device of claim 6, further comprising:
a determination section that determines whether the falsification prevention processing is applied by the falsification prevention circuit, and
when the determination section determines that the falsification prevention processing is applied, the controller creates:
a second file, in which falsification prevention processing has been applied by the falsification prevention circuit to data containing voice data and/or image data constituting the deletion candidates, among voice data and/or image data that has been acquired using the information input device, and
a third file in which falsification prevention processing has been applied by the falsification prevention circuit, after having deleted voice data and/or image data constituting the deletion candidates from voice data and/or image data that has been acquired using the information input device.

* * * * *